United States Patent
McGill

(10) Patent No.: US 9,489,670 B2
(45) Date of Patent: Nov. 8, 2016

(54) HYBRID WIRELESS SHORT RANGE PAYMENT SYSTEM AND METHOD

(71) Applicant: Conversant Intellectual Property Management Inc., Ottawa (CA)

(72) Inventor: Randy McGill, St. Augustine, FL (US)

(73) Assignee: Conversant IP Management Inc., Ottawa, Ontario ( * ) Notice: Subject to any disclaimer, the term of this patent is extended or adjusted under 35 U.S.C. 154(b) by 0 days.

(21) Appl. No.: 14/836,456

(22) Filed: Aug. 26, 2015

(65) Prior Publication Data

US 2016/0210613 A1    Jul. 21, 2016

Related U.S. Application Data

(63) Continuation-in-part of application No. 14/598,219, filed on Jan. 15, 2015, now Pat. No. 9,239,979.

(51) Int. Cl.
  *G06K 19/06*     (2006.01)
  *G06Q 20/32*     (2012.01)
  *H04B 5/00*      (2006.01)

(52) U.S. Cl.
  CPC ...... *G06Q 20/3274* (2013.01); *G06Q 20/3224* (2013.01); *G06Q 20/3278* (2013.01); *H04B 5/0031* (2013.01)

(58) Field of Classification Search
  USPC .......................................... 235/491, 462.01
  See application file for complete search history.

(56) References Cited

U.S. PATENT DOCUMENTS

| | | | | |
|---|---|---|---|---|
| 9,092,654 | B2* | 7/2015 | Wang | G06K 7/14 |
| 2009/0261166 | A1* | 10/2009 | Lawson | G06K 7/083 |
| | | | | 235/449 |
| 2011/0145054 | A1* | 6/2011 | Chetty | G06F 9/4411 |
| | | | | 705/14.38 |
| 2012/0067943 | A1* | 3/2012 | Saunders | G06K 7/1095 |
| | | | | 235/375 |
| 2012/0084391 | A1* | 4/2012 | Patel | G06Q 30/06 |
| | | | | 709/217 |
| 2013/0013490 | A1* | 1/2013 | Keller | G06Q 20/3226 |
| | | | | 705/39 |
| 2014/0108123 | A1* | 4/2014 | Russell | G06Q 30/0238 |
| | | | | 705/14.38 |
| 2014/0156376 | A1* | 6/2014 | Sellers | G06Q 20/3276 |
| | | | | 705/14.38 |
| 2015/0066368 | A1* | 3/2015 | McKenzie | G01C 21/3635 |
| | | | | 701/538 |
| 2015/0077323 | A1* | 3/2015 | Ramaswamy | G06F 3/012 |
| | | | | 345/156 |
| 2015/0186765 | A1* | 7/2015 | Osborne | G06K 19/06112 |
| | | | | 235/375 |

* cited by examiner

*Primary Examiner* — Allyson Trail
(74) *Attorney, Agent, or Firm* — Conversant IP Management Corp.

(57) ABSTRACT

A smart phone payment management system includes a synthetic barcode module and near field communication module. Each module is configured to wirelessly convey payment information to a point of sale, with the synthetic barcode module being available for use if the point of sale is not equipped with a compatible near field communication terminal.

14 Claims, 17 Drawing Sheets

Scan

HYBRID WIRELESS SHORT RANGE PAYMENT SYSTEM AND METHOD

RELATED APPLICATION

This application is a continuation in part of and claims the benefit of priority of U.S. Nonprovisional application Ser. No. 14/598,219 filed Jan. 15, 2015, the entire contents of which are incorporated herein by this reference.

FIELD OF THE INVENTION

This invention generally relates to wireless communication of payment information to a point of sale (POS), and more particularly, to a system and method for communicating, from a smart phone, payment information, including coupon information, via near field communication (NFC), if the POS is equipped with a compatible NFC terminal, or via optical synthetic barcode, as a default, if the POS lacks a compatible NFC terminal, but includes a barcode reader.

BACKGROUND

A point of sale (POS) terminal comprises hardware and software used for checkouts. Such systems are widely used in retail establishments, including, but not limited to grocery stores, restaurants and countless other places of business. Among the various types of equipment used by POS terminals is a barcode reader (or barcode scanner). Recently, some POS terminals include NFC payment systems.

As is well known, a barcode reader optically senses a barcode image and produces electronic signals corresponding to the sensed image. One type of reader is a pen-type reader that consists of a light source and a photodiode that are placed next to each other in the tip of a pen or wand. The photodiode measures the intensity of the light from the light source that is reflected back by white spaces in the barcode. Processing circuitry generates a waveform corresponding to the widths of the bars and spaces in the barcode. The waveform is then decoded.

Another type of reader is a digital camera or CCD reader, which uses an array of light sensors to measure the intensity of emitted ambient light from the bar code immediately in front of it. A voltage pattern identical to the pattern in a bar code is generated in the reader by sequentially measuring the voltages across each sensor.

Neither a pen-type nor a CCD/camera-type reader is the most popular type of reader for POS terminals. Laser scanners predominate. In general, they work the same way as pen type readers except that they use a laser beam as the light source and typically employ either a reciprocating mirror or a rotating prism to scan the laser beam back and forth across the bar code. As with the pen type reader, a photodiode measures the intensity of the light reflected back from the bar code. In both pen readers and laser scanners, the light emitted by the reader is rapidly varied in brightness with a data pattern and the photodiode receive circuitry is designed to detect only signals with the same modulated pattern. Laser scanners operate quickly and reliably. With an arrangement of mirrors and lenses, a laser scanner station of a POS system effectively scans barcodes on merchandise so long as the barcode is passed through the scanning field, even though the barcode may not directly face the scanner and may never come to a complete rest in the scanning field. Pen and CCD scanners cannot do this.

While conventional laser scanners are superb at reliably scanning printed barcodes, for various reasons they cannot reliably scan barcodes displayed as images on electronic displays. Some CCD/camera type scanners are useful for scanning barcodes displayed as images on electronic displays; however, for various reasons, these types of scanners are not in widespread use. One reason may be that they require the barcode to be stationary immediately in front of the scanner. Such precise positioning requirements would cause the grocery checkout process to grind to a halt. Another reason is relatively high cost. Most retailers have little or no reason to abandon their fully functional laser scanners for more temperamental and costly CCD/camera type scanners.

In recent years, secure payment has become a concern. Stolen credit cards may be used for purchases. Clerks rarely verify a credit card user's identification, and when they do, they are not trained to determine if identification is authentic.

Concomitantly, in recent years, convenient payment mechanisms have emerged. Many individuals prefer a smart phone over wearing a wristwatch for telling time. Many of the same individuals prefer a smart phone over carrying a bulky wallet containing cash and credit cards that are vulnerable to theft. To meet this need, various innovators have devised wireless RF payment mechanisms, particularly near field communication (NFC) payment systems. NFC employs protocols that enable certain smart phones and point of sale (POS) payment devices to establish radio communication with each other by touching the devices together or bringing them into proximity to a distance of typically 10 cm (3.9 in) or less. Through magnetic induction between two loop antennas, located within the phone and POS payment device, effectively forming an air-core transformer, NFC operates at 13.56 MHz on ISO/IEC 18000-3 air interface and at rates ranging from 106 kbit/s to 424 kbit/s.

An example of an emerging NFC payment systems is Google Wallet, which allows consumers to store credit card and store loyalty card information in a virtual wallet on a smart phone and then communicate payment information to compatible NFC-enabled POS payment devices (e.g., PayPass-enabled terminals). A competitor to Google Wallet, Apple Pay also uses a virtual wallet, but only works with iPhone 5 and later models smart phones and some late model Apple tablets, and only works with POS systems equipped with compatible Apple hardware.

While a user of an NFC-equipped smartphone may avoid carrying a wallet for certain payments, the mechanism is not without problems. Among the problems with these new wireless payment mechanisms is cost. Merchants must invest in new payment processing equipment and software for every checkout lane. Not only is this expensive, but it is fraught with risks—the risk of incompatibility with existing software and hardware, the risk of failure of the software or hardware due to bugs, the risk of inadequate consumer adoption to justify the expense, the risk of a superior alternative system prevailing in the marketplace, much in the way VHS tapes prevailed over Betamax in the 1980s.

Additionally, communicating payment information wirelessly, even over a short range, incurs risk. Notwithstanding any encryption, radio frequency communication risks eavesdropping, data corruption and manipulation, and interception.

Many consumers possess smart phones that work well, but are not equipped for NFC communication. Smart phone manufacturers prefer that consumers upgrade their phones to the latest models equipped for NFC communication. Cellular service providers also prefer such upgrades, for the attendant profit and consumer commitment to the carrier.

Thus, there is little to no incentive for smart phone manufacturers or cellular service providers to promote wireless payment systems for the countless phones that are not equipped with NFC communications equipment.

Even users of smart phones equipped with NFC payment systems face limitations due to incompatibilities. As many retailers accept NFC payments via one brand/method of NFC payment, but not another brand/method, or no payments via NFC, consumers must still carry their credit and debit cards. Few if any consumers are equipped to take advantage of every possible NFC payment methodology. A consumer with an old model smart phone or a smart phone equipped for payment using one particular brand of NFC payment methodology, cannot pay by NFC at a retailer that accepts only a non-compatible NFC payment methodology.

What is needed is a secure smart phone payment mechanism that enables wireless payment processing over alternative wireless payment gateways, including one gateway that employs hardware already included in the vast majority of smart phones and the vast majority of POS payment systems.

The invention is directed to overcoming one or more of the problems and solving one or more of the needs as set forth above.

SUMMARY OF THE INVENTION

To solve one or more of the problems set forth above, in an exemplary implementation of the invention, a hybrid wireless short range payment system and method enable payment using either NFC for compatibly equipped smart phones and NFC POS terminals, or using synthetic barcodes for conventional smart phones and POS systems that include a laser barcode scanner. A user may select which wireless payment gateway to use. Alternatively, a software application may select which wireless payment gateway to use based upon sensed input. For example, upon sensing the presence of a compatible NFC payment terminal, a smart phone may elect to proceed with payment via NFC. However, after an initial polling, failure of the smart phone to detect the presence of a compatible NFC payment terminal may cause the system to elect payment by synthetic barcode as a default wireless payment methodology. In either case, payment details may be provided from a secure digital wallet. Additionally, in either case, coupon data, in addition to payment data, may be communicated to the POS system via the selected wireless gateway. The coupon data may comprise data for coupons selected from one or more databases by a user, or data for coupons corresponding to the items purchased and/or the retail establishment as determined by software.

A barcode data management system that includes a synthetic barcode module is provided. The synthetic barcode module may be a standalone electronic device, an accessory that plugs into an electronic device such as a smart phone or digital music player, or a smart phone configured to emit synthetic barcodes, as described herein. The synthetic barcode module emits light pulses that are read as one or more barcodes by a conventional laser barcode scanner at a point of sale. The barcodes correspond to payment information. The point of sale is configured, i.e., equipped, with hardware and software to determine payment information from the light pulses comprising the synthetic barcode.

An exemplary programmable synthetic barcode module comprises a data file (e.g., an audio file or data file), light emission components and a controller. In a conventional data file embodiment, a controller determines light pulse information from the file. In an audio file embodiment, a player plays an audio file. Audio output from the audio file is modulated in such a way as to correspond to barcode data using a digital to audio modulation scheme. The light emission components driven by a controller emit light pulses that emulate light reflected from a scanned barcode. The light emission components include screen elements (e.g., pixels or LEDs) of a display screen. The controller interfaces with a compatible microprocessor or microcontroller and receives signals from a demodulated audio signal stream corresponding to one or more barcodes. The controller causes the light emitting components to generate signals that cause the light management components to emit, via the LED. The generated signals are driver signals that cause the light emitting components to emit the light pulses that emulate light reflected from a scanned barcode to communicate the barcode optically. A sensor may receive light from a scanner to enable the system to determine if the received light pulses correspond to a barcode scanner by checking stimulus timing (e.g., by determining if the timing of received light pulses corresponds to light pulses emitted from a barcode scanner).

In one embodiment, the synthetic barcode module is a key part of a system comprising a smart phone, tablet or other similar portable electronic device, with computing and wireless communication capability. As used herein, a smart phone, smartphone, cell phone or mobile phone refers to an electronic device used for full duplex two-way radio telecommunications over a cellular network of base stations. In addition to being a telephone, a smart phone as contemplated herein supports additional functions and services. A smart phone is merely one type of mobile computing device with which the invention may be used.

The smart phone receives and stores barcode data, such as payment data, from a computer system or user input. Optionally, an application referred to as a payment management application is executable on the smart phone and enables management of the received and stored payment data and interfacing to one or more services that supply payment data to the smart phone. Though such an application may be advantageous, it is not required. The smart phone supplies the received payment data to the synthetic barcode module, which may be part of the phone or a separate plug-in accessory. The payment data includes barcode data for generating a synthetic barcode. The synthetic barcode module discriminates light pulses received from a barcode scanner from light received from other sources such as ambient light sources. After instructed to pay, the synthetic barcode module detects a scanner and emits light pulses that simulate light reflected from a barcode corresponding to the payment data received from the smart phone. By waiting for a barcode scanner to be present, the system reduces the risk of unauthorized reception by an optical reader other than an intended laser barcode scanner. The scanner interprets the light pulses as light reflected from a barcode corresponding to the payment.

As used herein a payment code means data that will cause the synthetic barcode module to emit light pulses that emulate barcodes comprising the payment data. The payment data comprises numeric codes and/or alphanumeric codes, i.e., characters.

A payment management method according to principles of the invention includes steps of providing a synthetic barcode module; receiving, on a smart phone, payment data from user input or from a payment data source, such as a remote computer system configured to deliver payment data; interfacing the synthetic barcode module to the smart phone;

using the synthetic barcode module, receiving light emitted from a laser barcode scanner; generating a signal from the light received from the external light source using the LED; conditioning the signal from the light received from the external light source to improve signal to noise ratio; determining if the signal corresponds to light received from a barcode scanner; and, if the signal corresponds to light received from a barcode scanner, generating optical output using the synthetic barcode module, said optical output corresponding to payment data and simulating light reflected from a barcode for the payment data.

An exemplary synthetic barcode module according to principles of the invention includes light emitters that produce output signals corresponding to received light pulses, emits light pulses that emulate light reflected from a scanned barcode in scan mode. The light emitters may include an LED operating as an optical emitter. A controller receives and stores at least one code corresponding to at least one payment data field, receives output signals corresponding to received light pulses, determines if the received light pulses correspond to a barcode scanner, and outputs driver signals to cause the light management module to emit light pulses that emulate light reflected from a scanned barcode to communicate the at least one payment code optically to the barcode scanner. The synthetic barcode module may be integrated with the mobile computing device. If received light pulses correspond to a barcode scanner, as determined by checking stimulus timing, then synthetic barcode (e.g., payment code) output is produced. The payment code corresponds to a barcode of a payment.

In another embodiment, the mobile computing device is a smart phone (such as a smart phone) configured to receive payment codes in the form of audio files from a remote source via wireless cellular communication. The audio files may comprise data corresponding to gift cards, food stamp cards or the like. A client application executable on the mobile computing device manages user selection and use of each payment code, controls transmission of each payment code from the mobile computing device to the payment synthetic barcode module via the audio interface by playing the audio files. A plurality of payment codes may be stored in a queue on the mobile computing device, with the client application providing a function for a user to control sending a next payment code in the queue from the smart phone to the module. Alternatively, the client application working with a microphone in the mobile computing device may detect audible signals corresponding to a successful scan of a payment. Upon such detection, the next payment code in the queue would be sent. The client application also provides a search tool configured to search for available payment codes from one or more remote source.

In another exemplary embodiment, no intelligent host is needed. The synthetic barcode module could be programmed with new payment codes through an audio output jack from any device that reproduces (i.e., plays) sound. Such devices may include TV and radio receivers. In this instance, an advertiser would instruct the user to plug their unit into the earphone jack, or to place the device's microphone in close proximity to the speaker, to have their module programmed with the advertised payment code(s). Payment codes could also be distributed on iTunes or any internet service that enables someone to download audio files.

In another embodiment, an exemplary synthetic barcode module according to principles of the invention includes a light management module that produces output signals corresponding to received light pulses, emits light pulses that emulate light reflected from a scanned barcode in scan mode, and emits light pulses that enable optical bidirectional communication in programming mode. The light management module includes an LED operating as both an optical receiver and an optical emitter. The LED receives light pulses, produces output signals corresponding to the received light pulses, and emits light pulses. A controller module receives and stores at least one code corresponding to at least one payment data field, receives output signals corresponding to received light pulses, determines if the received light pulses correspond to a barcode scanner, and outputs driver signals to cause the light management module to emit light pulses that emulate light reflected from a scanned barcode to communicate the at least one payment code optically to the barcode scanner. An audio interface (e.g. audio jack) communicatively couples the module to a mobile computing device such as a smart phone. The synthetic barcode module may be removably attachable to or integrated with the mobile computing device. The controller module determines if the received light pulses correspond to a barcode scanner by checking stimulus timing and determining if the timing of received light pulses corresponds to a barcode scanner. The payment code corresponds to payment information of a credit card, debit card, gift card, smart card, payment account or other means of payment. A housing contains the controller module.

The exemplary synthetic barcode module also includes analog signal receiving and processing components, such as an FSK receiver and UART, to convert received analog input into digital data that can be used by the microcontroller.

An exemplary programmable synthetic barcode module comprises light management components and a controller. The light management component emits light pulses that emulate light reflected from a scanned barcode. The light management components include an LED operating as both an optical receiver and an optical emitter. The LED receives light pulses and emits light pulses. The controller interfaces with a compatible electronic device, receives one or more codes corresponding to one or more payment barcodes, signals corresponding to light received by the light management components via the LED, determines if the received light pulses correspond to scanner output, and outputs driver signals to cause the light management module to emit the light pulses that emulate light reflected from a scanned barcode to communicate the payment barcode optically. The controller determines if the received light pulses correspond to barcode scanner by checking stimulus timing (e.g., by determining if the timing of received light pulses corresponds to light pulses emitted from a barcode scanner). A signal conditioning circuit operably coupled to the LED and the controller improves a signal to noise ratio and supplies a logic level signal to the controller module corresponding to light received by the LED. The light management module includes an LED driver configured to regulate electrical power supplied to the LED.

In another embodiment, the synthetic barcode module is a key part of a system that also includes a smart phone with computing and wireless communication capability (or any other portable electronic computing device with wireless communication capability and a port for connecting and an interface for operably coupling the synthetic barcode module) and a remote computer system. The synthetic barcode module can be interfaced with the smart phone. As used herein, a smart phone, smart phone or mobile phone refers to an electronic device used for full duplex two-way radio telecommunications over a cellular network of base stations. In addition to being a telephone, a smart phone as contemplated herein supports additional functions and services. A smart phone is merely one type of mobile computing device with which the invention may be used.

The smart phone stores encrypted payment data. An application referred to as a payment management application is executable on the smart phone and enables management of the received and stored payment data and interfacing to one or more services that supply payment data to the smart phone. The smart phone decrypts the encrypted data and supplies it to the synthetic barcode module. The payment data includes barcode data for generating a synthetic barcode. The synthetic barcode module discriminates light pulses received from a barcode scanner from light received from other sources such as ambient light sources. When the synthetic barcode module detects a scanner, it emits light pulses that simulate light reflected from a barcode corresponding to the payment data received from the smart phone. The scanner interprets the light pulses as light reflected from a barcode corresponding to the payment.

An exemplary synthetic barcode payment methodology comprises determining if a laser barcode scanner is present; positioning a light emitter in optical communication with the laser barcode scanner; and causing the light emitter to pulse at a frequency sensible by a laser barcode scanner and in a manner to emit pulses of light that emulate light reflected from a plurality of barcodes scanned by the laser barcode scanner, said plurality of barcodes encoding payment data. The step of determining if a laser bar code scanner is present may entail receiving light from the laser bar code scanner and determining if the received light is laser light at about a frequency corresponding to the laser barcode scanner. The plurality of barcodes may comprise a plurality of UPC or EAN barcodes, and may include a first barcode indicating that a series of payment barcodes will follow and a last barcode indicating that the series of payment barcodes have been provided, with each barcode encoding a plurality of numbers, including pairs of numbers, with each pair of numbers encoding a character of a plurality of characters comprising the payment data. The light emitter may comprise an LED or display screen elements of a smart phone, such as an active matrix organic light emitting diode display or an active matrix RGB backlit liquid crystal display. The step of determining if a laser bar code scanner is present may comprise receiving light from the laser bar code scanner using an optical sensor and, using a controller operably coupled to the optical sensor, determining if the received light is laser light at about a frequency corresponding to the laser barcode scanner.

BRIEF DESCRIPTION OF THE DRAWINGS

The foregoing and other aspects, objects, features and advantages of the invention will become better understood with reference to the following description, appended claims, and accompanying drawings, where:

Figure 1:
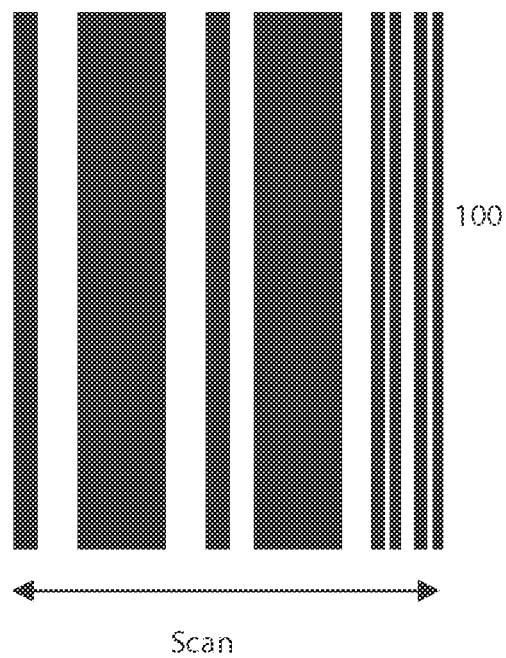
FIG. 1 provides a schematic diagram that conceptually illustrates principles of an exemplary synthetic barcode process according to principles of the invention.

Those skilled in the art will appreciate that the figures illustrate one or more exemplary embodiments and are not intended to be drawn to any particular scale; nor are the figures intended to illustrate every embodiment of the invention. Flowcharts illustrate exemplary processes, which may include fewer, additional or different steps, and in different orders, and yet remain within the scope of the invention. Block diagrams illustrate exemplary systems, which may include fewer, additional or different components, and in different configurations, and yet remain within the scope of the invention. Thus, the invention is not limited to the exemplary embodiments depicted in the figures or the particular circuitry, components, applications, or ornamental aspects, steps, configurations or arrangements shown in the figures.

DETAILED DESCRIPTION

A smart phone wireless payment system that enables payment by NFC and by synthetic barcode is provided. The device is capable of detecting a compatible NFC payment terminal at a POS. The device is also capable of detecting the presence of a conventional laser barcode scanner and capable of communicating barcode information, such as payment information, in a form readable by a detected conventional laser barcode scanner.

As used herein, payment data broadly denotes information that causes a synthetic barcode module to emit light pulses comprising a series of barcodes that contain payment information relevant to a transaction. The information is communicated optically by light pulses readable by a barcode scanner. By way of example and not limitation, a payment may comprise a credit card charge, debit card debit, gift card debit, food stamp debit, or any other transaction that enables the purchasing a product or service.

A key component of the system is a synthetic barcode module configured to emit light that emulates light reflected from a scanned barcode associated with a payment based upon an audio file or data file. Uniquely, an exemplary module employs one or more pixels or LEDs of a display screen to emit light that emulates light reflected from a scanned barcode. For convenience of reference, the light emitter is referred to herein as an LED, even though it may comprise a plurality of LEDs or one or more pixels of an AMOLED display.

A module according to principles of the invention may be integrated with a smart phone. A smart phone is merely one type of mobile computing device with which the invention may be used. By way of example and not limitation, a smart phone, as contemplated herein, is configured to store and process payment data and communicate data signals to a synthetic barcode module as described herein. Components of an exemplary smart phone with which the invention may be used include a rechargeable battery and power management circuit providing a power source and power management functions; an input mechanism and display to allow the user to interact with the phone such as a keypad or touch screen; memory for data storage such as nonvolatile RAM; a processor comprising a central processing unit to handle various commands and functions and data processing; analog-to-digital and digital-to-analog converters to translate the outgoing audio signal from analog to digital and the incoming signal from digital back to analog; and a radio frequency (RF) transceiver to amplify, encode, decode, receive and transmit RF signals.

Alternatively, a module according to principles of the invention may be an integral part of a mobile computing device such as a smart phone. In such an embodiment, the module is still configured to interface with and be controlled by the mobile computing device.

The smart phone may receive and store data in the form of data files or in the form of audio files corresponding to payment information. As used herein, an audio file broadly refers to any file or data stream for storing or communicating digital audio data on a computer system. This data can be stored uncompressed, or compressed to reduce the file size. It can be a raw bit stream, but it may be in a container format or an audio data format with a defined storage layer. By way of example and not limitation, uncompressed audio data may be stored using pulse code modulation (PCM), such as in a .wav file on Windows or in a .aiff file on Mac OS. The AIFF format is based on the Interchange File Format (IFF). The WAV format is based on the Resource Interchange File Format (RIFF), which is similar to IFF. WAV and AIFF are flexible file formats designed to store more or less any combination of sampling rates or bitrates. While payment data may be encoded in audio files, the invention is not limited to use of audio files. Rather, other files, data sets, data streams and data structures may be used within the spirit and scope of the invention.

In a preferred embodiment, the audio file encodes a series of tones. When played using a media player application, the audio file causes the device (e.g., smart phone) to generate the series of tones. Each tone may be at one of two frequencies, representing either a digital zero or a digital one. By way of example and not limitation, a digital zero may be represented by a 1200 Hz tone, while a digital one may be represented by a 2200 Hz tone. A numerical designation for a barcode may be represented in binary notation, using digital ones and zeros. Start bits and stop bits may also be represented using digital ones and zeros. When the audio file is played by a media player, analog audio signals corresponding to the series of tones, which represent a barcode, and any additional data such as start and stop bits, are emitted through the audio output jack. As described in more detail below, the synthetic barcode module receives and converts the analog signals back into a serial bit stream comprised of digital ones and zeros.

When prompted by a user, a client application executed on the smart phone plays an audio file that corresponds to a payment. The audio is decoded by the module into optical driver signals. The module emits light pulses from the driver signals. Light emitted from the module corresponds to a barcode, such as a payment barcode. The barcode scanner interprets the emitted pulses of light as light reflected from a barcode for a corresponding payment. If there are several payment sources (e.g., a gift card and a credit card), the user may instruct the smart phone to play a series of audio files until all barcodes for all payment sources have been used. Alternatively, the phone may be configured to automatically play the next audio file corresponding to the next payment information barcode according to a time schedule or based upon detection (e.g., audible detection) of a positive scan. Thus, the invention provides an easy-to-use paperless wireless barcode on demand system that works with conventional laser barcode scanners.

Referring now to the Figures, in which like parts are indicated with the same reference numerals, various views of an exemplary compact, reliable, adaptable and inexpensive system and method for communicating payment barcode data in a form readable by a conventional laser barcode scanner are conceptually shown. For convenience of reference, an electronic assembly that decodes audio files to drive light emitting elements that emit light pulses that emulate light reflected from a determined barcode in accordance with principles of the invention is referred to herein as a synthetic barcode module.

Advantageously, a synthetic barcode module according to principles of the invention may supply an optical signal to a conventional barcode scanner, such as laser scanners in widespread use in retail and industrial establishments. The optical signal emulates light reflected from a determined barcode, such that the decoded output from the scanner is equivalent to the decoded output that would be produced by scanning the emulated printed barcode. Consequently, standard inventory universal product code (UPC) scanning technology may be employed without an actual barcode being displayed. Many conventional point of sale systems will require no modification or enhancement to accommodate a synthetic barcode module according to principles of the invention.

In an exemplary embodiment, the synthetic barcode module is configured to emit light pulses that emulate light reflected to a barcode scanner from a scanned printed barcode, which may be any type of barcode, such as, for example, UPC, SKU, EAN, Interleaved 2 of 5, Code 93, Code 128, Code 39, or any other standardized or specially designed type of barcode or barcode symbology comprising parallel lines. A typical barcode scanner uses a scanning beam, typically narrow band light in the visible spectrum such as red laser, but potentially any bandwidth of light in the visible or infrared spectra, to pass over a sequence of nonreflecting and reflecting bars, such as dark (e.g., black) bars and light (e.g., white) spaces comprising a conventional barcode. However, the invention is not limited to use with conventional black and white visible barcodes. Instead, any alternating photon reflecting and photon absorbing materials may be utilized to provide the desired light absorption and reflecting effect. Pigments tend to appear as the colors they are because they selectively reflect and absorb certain wavelengths of visible light. Certain pigments selected to reflect the color of light emitted by the light source may be utilized for the reflecting regions, while pigments selected to absorb the color of light emitted by the light source may be utilized for the reflecting regions. A pigment that reflects across the entire visible wavelength range (i.e., about 380-770 nanometers) appears as white. Black surfaces absorb these wavelengths. If some regions of this light are absorbed and others reflected, then the object is colored. For example, an object that absorbs all visible light except the region 400-450 nm appears blue, while another that reflects only 650-700 nm light has a red color. As further examples, chlorophyll pigments absorb blue and red light but transmit green accounting for the color of leaves. Carotenoid pigments absorb violet and blue but transmit yellow, orange, and red, accounting for the bright orange color of carrots and apricots, which are rich in carotene.

Figure 2:
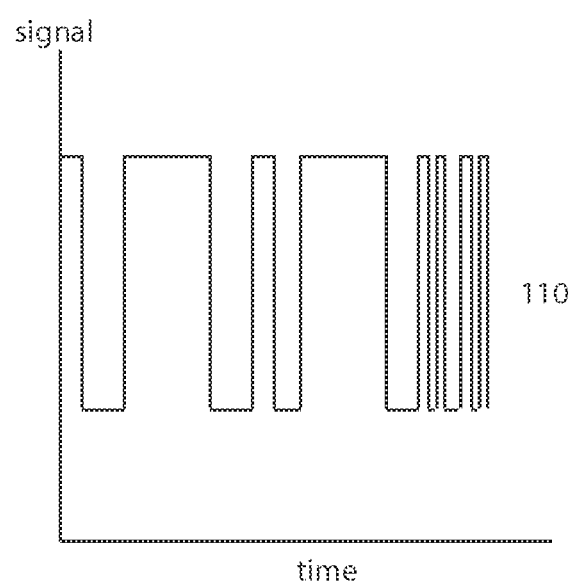
FIG. 2 provides a schematic diagram that conceptually illustrates principles of an exemplary synthetic barcode process according to principles of the invention.

Scanning may progress sequentially left to right and/or right to left. As the beam of light scans across a barcode, such as the barcode 100 shown in FIG. 1, the beam is at least partially reflected back to the scanner by the spaces and at least partially absorbed by the bars. A receiver, such as a photocell detector, in the barcode scanner receives the reflected beam and converts it into an electrical signal. As the beam scans across the barcode, the scanner typically creates one electrical signal for the spaces where the beam is reflected, and a different electrical signal for the bars where the beam is absorbed. This process is conceptually illustrated by the signal stream 110 in FIG. 2. The scanning speed and the width of each space and bar determine the duration of each electrical signal. The signals (including their duration) are decoded by the scanner or by an external processor into characters that the barcode represents.

Figure 3:
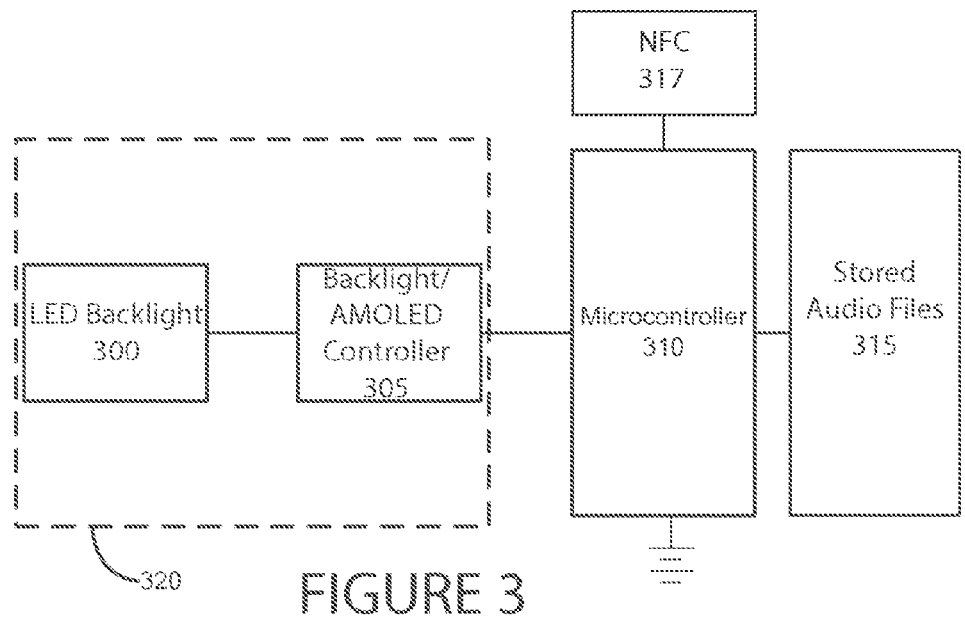
FIG. 3 provides a high level block diagram of components of an exemplary embodiment of a synthetic barcode module assembly according to principles of the invention.

As conceptually illustrated in FIG. 3, a first embodiment of an exemplary synthetic barcode module comprises components that are intended to be the target of the standard point of sale barcode scanners, such as those used at checkout lanes. An LED 300 serves as a light source. The LED 300 may be part of a backlight for an LCD or a part of an AMOLED display. More than one LED may be used.

The microcontroller 310 is a programmable integrated circuit comprised of a CPU with support features, such as an oscillator, timer, watchdog, and serial and analog I/O. Program memory, such as memory in the form of flash or ROM is included as well as a some RAM. The microcontroller 310 may include an analog to digital converter (ADC) to convert input analog voltage (or current) continuous signals to discrete digital data. The microcontroller 310 may also include a digital-to-analog converter (DAC) to perform the reverse operation for output signals. The microcontroller 310 is programmed to cause the controller 305 to energize the LED and transmit light pulses in a fashion to simulate the reflections from printed barcodes using the EAN-13, UPC-A, or other standard barcode systems, so that the emitted pulses can be read using a conventional barcode reader. The microcontroller 310 may be comprised of any suitable controlling device, such as a logic circuit, a microprocessor, a combination of these elements, and the like. Thus, the microcontroller may comprise a single integrated circuit or a combination of components typically included in smart phones.

The microcontroller 310 may have an internal clock oscillator as the time base for all operations. Alternatively, a crystal and associated circuitry may be utilized for a timing base. It may also have internal memory, which may store programming for the module and a table that determines the time and duration the LED 300 must be illuminated in order to generate light pulses comprising the synthetic barcode signal. Timing data for barcode synthesis may reside in the microcontroller 310 from manufacture or may be downloaded at some later point through any type of communications medium, e.g. RS232, RF data link, optical data link, etc.

In an exemplary embodiment, the microcontroller decodes control signals from audio files 315 stored in the smart phone's memory or other storage. The microcontroller 310 sends control signals to the controller 305 to make the LED 300 turn on and off with sufficient brightness, and at the correct timing, for the emitted light to be interpreted by a standard laser barcode scanner as the signal from a printed barcode. By way of example and not limitation, the microcontroller 310 may modulate the light emission period by sending control signals to the controller 305.

In an exemplary embodiment, a smart phone may be further equipped with a near field communication (NFC) module, such as NFC module 317, operably coupled to microcontroller 310. An NFC module according to principles of the invention provides contact-less smart card (RFID/NFC) functionality to the phone so that the phone may be used as a payment instrument. The module permits the presence of the phone to be detected when in proximity to an NFC reader at locations where transactions are to be made (e.g., a retail POS system). Using the module, the phone sends account information (stored in the phone) via short range radio signaling in response to a request from the reader (POS NFC reader). The account information and the transaction to be conducted may be verified by entering a user PIN, e.g., at the keyboard of the phone and/or the reader.

In one implementation, the module 317 may include an NFC transceiver for transmitting and receiving short range radio signals, a security processor, and a memory. Depending on the implementation, the NFC device may be either passive or active. If passive, it relies on the power from the radio signals of a nearby NFC reader. If active, it has a source of power, such as the battery of the phone, and may always be transmitting (or listening for) NFC signals. In other cases, the module 317 may be a hybrid NFC device that is "asleep" (and draws no power) until either deliberately turned on (e.g., by pressing a designated key of the phone), or upon being placed in proximity to an NFC reader, which reader provides sufficient power through radio signals to "wakeup" the device and thereafter cause it to be powered by its own source (e.g., the cell phone battery). A processor provides security and other processing for data transmitted or received by the NFC module, with security implemented by programmed code and logic that encrypts/decrypts data using determined encryption techniques. The processor may also be programmed to carry out an activation process, e.g., by receiving account data and storing that data in memory, and authenticating the account data by verifying a user PIN.

The module 317 may be interconnected with the phone in any of several different ways. For example, in some embodiments, the module 317 may be an NFC card that plugs into a port in the phone, with the card including a subscriber identity module (SIM) that provides user identification and memory for storage of programming logic and data. In yet other embodiments, the module 317 may be integrated into the internal circuitry of the phone and share functionality with at least some existing phone cell components.

In the exemplary embodiment, the microcontroller 310 causes the controller 305 to cause the LED 300 to emit light and cease emission for determined periods of time, according to a determined symbology. The symbology includes the encoding of the single digits/characters of the message as well as the start and stop markers into bars and space, the size of the quiet zone required to be before and after the barcode as well as the computation of a checksum. Illustratively, x millisecond periods (representing white spaces between bars) during which light is emitted and y millisecond periods (representing black bars) during which no light is emitted may be utilized to emulate light reflected from a barcode. The variable x may vary from a few milliseconds (e.g., 2 or 4 milliseconds) to multiples of that amount (e.g., 1, 2, 3 or 4 times that amount), depending upon the width of the space represented. Likewise, y may vary from a few milliseconds (e.g., 2 or 4 milliseconds) to multiples of that amount (e.g., 1, 2, 3 or 4) times that amount, depending upon the width of the bar represented. The timing works well across a wide range of barcode scanners. The barcode scanner interprets the emitted flashing light as an analog signal waveform of more or less rectangular-shaped pulses.

The LED 300 is a current-driven device whose brightness is proportional to its forward current. Forward current can be controlled either by applying a voltage source and using a ballast resistor or, preferably, by regulating LED current with a constant-current source, such as controller 305. The controller 305 supplies a correct amount of current to drive the LED 300. While a separate controller 305 is shown, the controller 305 could optionally be included or integrated into the microcontroller 310. The controller 305 eliminates changes in current due to variations in forward voltage, which translates into a constant LED brightness. Optionally, the controller 305 may enable Pulse Wave Modulation (PWM) dimming, which entails applying full current to the LED at a reduced duty cycle and at a high enough frequency (e.g., >100 Hz) to avoid pulsing that is visible to the human eye. In some embodiments, the controller 305 may be comprised of one or more pins on the microcontroller 310 with a current limiting resistor. A switched current source or current sink may also be used to drive the LED 300.

The microcontroller 310 receives and demodulates audio signals from audio files 315, producing digital output that can drive the controller 305. In a particular preferred embodiment, the audio interface includes a frequency shift keying (FSK) receiver 330 (or transceiver), which is signal processing circuitry that receives the analog audio input and generates binary data output. The binary data comprises the zeros and ones modulated in the analog audio signal. This data stream may include error detection and/or correction codes. The FSK receiver 330 may comprise discrete circuitry, an integrated circuit and/or an integral functional component of the microcontroller 310.

Tone detection may be accomplished using a fast Fourier transform (FFT) or the Goertzel algorithm. Using an FFT or Goertzel algorithm, the system may determine whether a tone (or tone pair) of a particular frequency is present in an audio stream.

In operation when a laser barcode scanner hits the LED 300, the signal conditioning circuit 305 communicates filtered and amplified signals to the microcontroller 310, which causes the controller 305 to drive the LED 300 in a manner that emits a predefined series of light flashes corresponding to light reflected to a scanner upon scanning a barcode. When that series of light flashes has been sent, the system module waits for another hit from a scanning laser beam to repeat the process. The timing of the transmitted light pulses may be preprogrammed in the microcontroller 310.

The synthetic barcode module sequentially communicates barcode data via a communication path (e.g., optical communication path). Thus, barcode data corresponding to payments may be communicated via an optical communication path using the synthetic barcode module.

Figure 4:
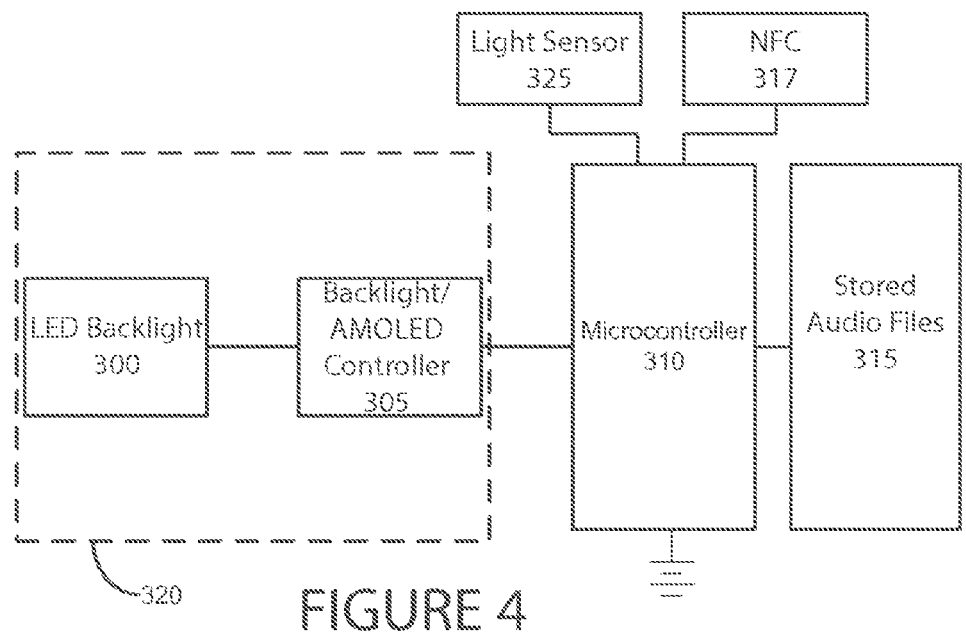
FIG. 4 provides a high level block diagram of components of another exemplary embodiment of a synthetic barcode module assembly according to principles of the invention.

As shown in FIG. 4, a photo receiver (i.e., light sensor) 325 may optionally be utilized. The photo receiver 325 may be comprised of any compatible photo detector capable of sensing electromagnetic energy in the visible and/or infrared parts of the spectrum, as emitted by a barcode scanner. Nonlimiting examples of suitable photo receivers include photoresistors which change resistance according to light intensity, photovoltaic cells which produce a voltage and supply an electric current when illuminated, photodiodes which can operate in photovoltaic mode or photoconductive mode converting light into either current or voltage, and phototransistors incorporating one of the above sensing methods. Many smart phones are equipped with an ambient light sensor for boosting brightness levels in dark environments. Additionally, a charge-coupled device (CCD) or complementary metal-oxide-semiconductor (CMOS) of a camera may operate as a light sensor 325. Any of the foregoing may be adapted to function as a light sensor.

Visible light ranges from 400 nm (violet/blue) to 700 nm (deep red). Wavelengths above 700 nm and up to about 5000 nm are known as near infrared. The CCD and CMOS sensors used in digital cameras today are sensitive to light with wavelengths up to around 1000 nm. However, for standard photography, capturing infrared light is not desirable, so the manufacturers put an IR-blocking filter in front of the camera's sensor. A typical IR-blocking filter limits the sensitivity of an unmodified camera to wavelengths below 700-705 nm. An HeNe laser found in older laser barcode scanners and a laser diode used in modern barcode scanners have an operation wavelength ($\lambda$) of about 630 to 650 nm, in the red portion of the visible spectrum. These wavelengths are well within the sensitivity of many CCD and CMOS sensors, even those equipped with an IR-blocking filter.

In the embodiment that employs a sensor 325 as illustrated in FIG. 4, the synthetic barcode module senses the presence of a laser scanner by detecting output corresponding to 630 to 650 nm light. When the scanner is detected, the synthetic barcode module responds by emitting the pulses of light to emulate a barcode. In this manner, such flashing is avoided unless a scanner is present. This reduces risk of unauthorized capture of optical output. As the flashing occupies at least a portion of the display, it is desirable to limit the flashing until a scanner is present. In the embodiment of FIG. 3, a user may initiate emission of barcode signals by entering a command. In the embodiment of FIG. 4, emission may commence when the phone is in the presence of a detected scanner.

Each embodiment shown in FIGS. 3 and 4 includes a controller 305. The LED 300 is operably coupled to the controller 305. The synthetic barcode circuit 405 of the embodiment shown in FIG. 4 includes the LED 300 operably coupled to the controller 305 and a photo receiver 325 operably coupled to the microcontroller 310. In that embodiment, the photo receiver 325 functions as an optical-to-electrical transducer. Thus, the difference between the two embodiments is that the photo receiver 325 is configured to sense optical input in the embodiment shown in FIG. 4, while the embodiment shown in FIG. 3 does not require such a sensor.

In one embodiment, a synthetic barcode module according to principles of the invention is integrated into a display, such as a backlit liquid-crystal display (LCD) or an active matrix organic light emitting diode (AMOLED) display. In either display, one or more LEDs is selectively illuminated to produce a synthetic barcode output as described above.

Figure 5:
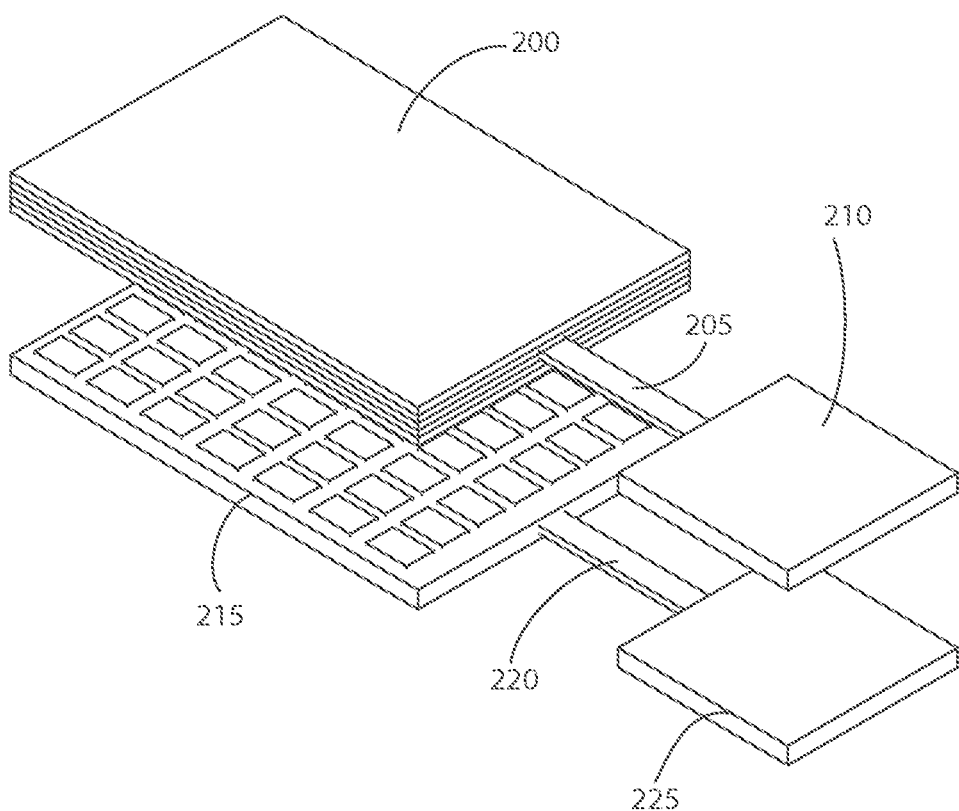
FIG. 5 provides a perspective view that conceptually illustrates components of an exemplary synthetic barcode module according to principles of the invention.

With reference to FIG. 5, an LCD 200, which uses the light modulating properties of liquid crystals, does not emit light directly. Instead, LCD displays, such as the LCD 200 conceptually illustrated in FIG. 5, require external light to produce a visible image. In a "transmissive" type of LCD, this light is provided at the back of the LCD glass "stack" 200 and is called the backlight 215. By way of example and not limitation, an LCD stack 200 may comprise a combination of glass polarizers (e.g., polarizing films), a liquid crystal layer, and a TFT matrix of thin film transistors and capacitors, with the TFT matrix and liquid crystal being sandwiched between the glass filters. A controller 210 is operably coupled to the TFT matrix of the stack 200 by cable(s) 205 or other conductive paths. The LCD controller 210 formats and scales the many types of computer and video signals so as to drive the TFT matrix of the LCD stack 200.

The LCD backlight 215 is behind the stack 200. Of particular relevance for the subject invention are LCD displays having LED active matrix backlights, particularly an RGB LED matrix. In such a display, an array of LEDs 215 behind the stack 200 includes rows (horizontal) and columns (vertical) of LEDs which provide the backlight. A backlight controller 225 coupled to the LED matrix by cable(s) 220 or other conductive paths controls LED illumination by providing regulated current to drive the LEDs. The backlight controller 225 may selectively illuminate any LED, in any primary color or combinations of RGB colors, and control brightness using pulse width modulation. In this embodiment, the microcontroller 310 causes the backlight controller 225 to controllably flash one or more LEDs of the active matrix 215, at a preferred color, while the microcontroller 310 causes the LCD controller 210 to maintain LCD at the illuminated LEDs in a transmissive state (e.g., transparent state) allowing the backlight to pass through the stack 200. The illumination and controlled flashing occurs in a manner to emulate reflectance of a scanned barcode, as described herein.

Figure 6:
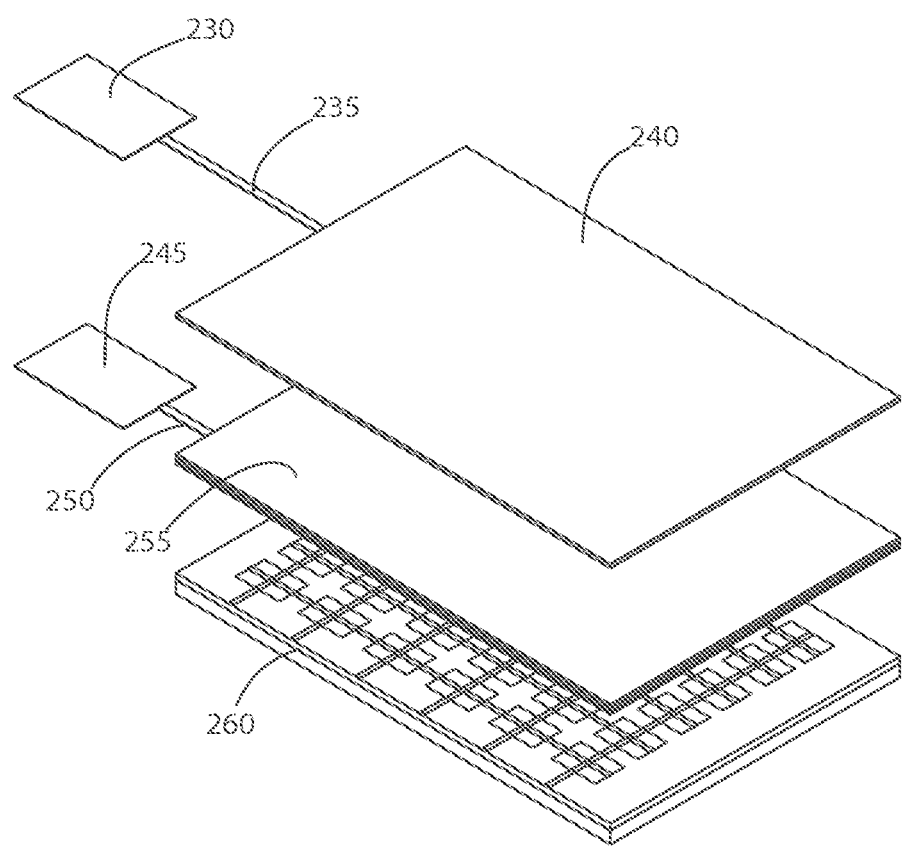
FIG. 6 provides another perspective view that conceptually illustrates components of an exemplary synthetic barcode module according to principles of the invention.

With reference now to FIG. 6, an AMOLED display is comprised of an active matrix of OLED pixels that generate light (luminescence) upon electrical activation. The AMOLED is made from layers of organic compounds 255 that emit light when electricity is applied. The organic active layers 255 are disposed between a cathode layer 240 and a TFT array 260. A cathode regulator 230 is operably coupled to the cathode layer 240 via cable(s) 235 or other conductive paths. The organic active layers 255 may be deposited or otherwise integrated onto the thin-film-transistor (TFT) array 260, which functions as a series of switches to control the current flowing to each individual pixel. A TFT controller 245 is operably coupled to the TFT layer 260 via cable(s) 250 or other conductive paths. A continuous current flow is controlled by at least two TFTs at each pixel (to trigger the luminescence), with one TFT to start and stop the charging of a storage capacitor and the second to provide a voltage source at the level needed to create a constant current to the pixel. In this embodiment, the microcontroller 310 causes the TFT controller 250 and cathode regulator 230 to controllably activate transistors of the TFT matrix 260 and cathode layer 240, to illuminate pixels at a preferred color, while the microcontroller 310 causes the TFT controller 250. Illumination and controlled flashing of the pixels occur in a manner to emulate reflectance of a scanned barcode, as described herein.

Figure 7:
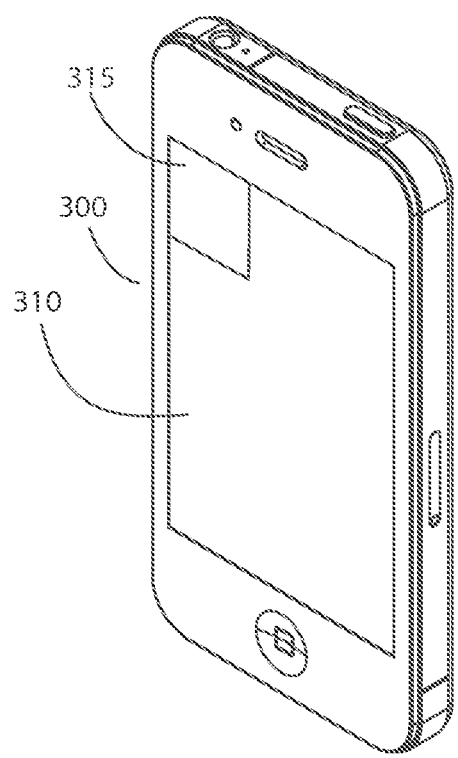
FIG. 7 provides a perspective view that conceptually illustrates a smart phone equipped with an exemplary synthetic barcode module according to principles of the invention.
Figure 8:
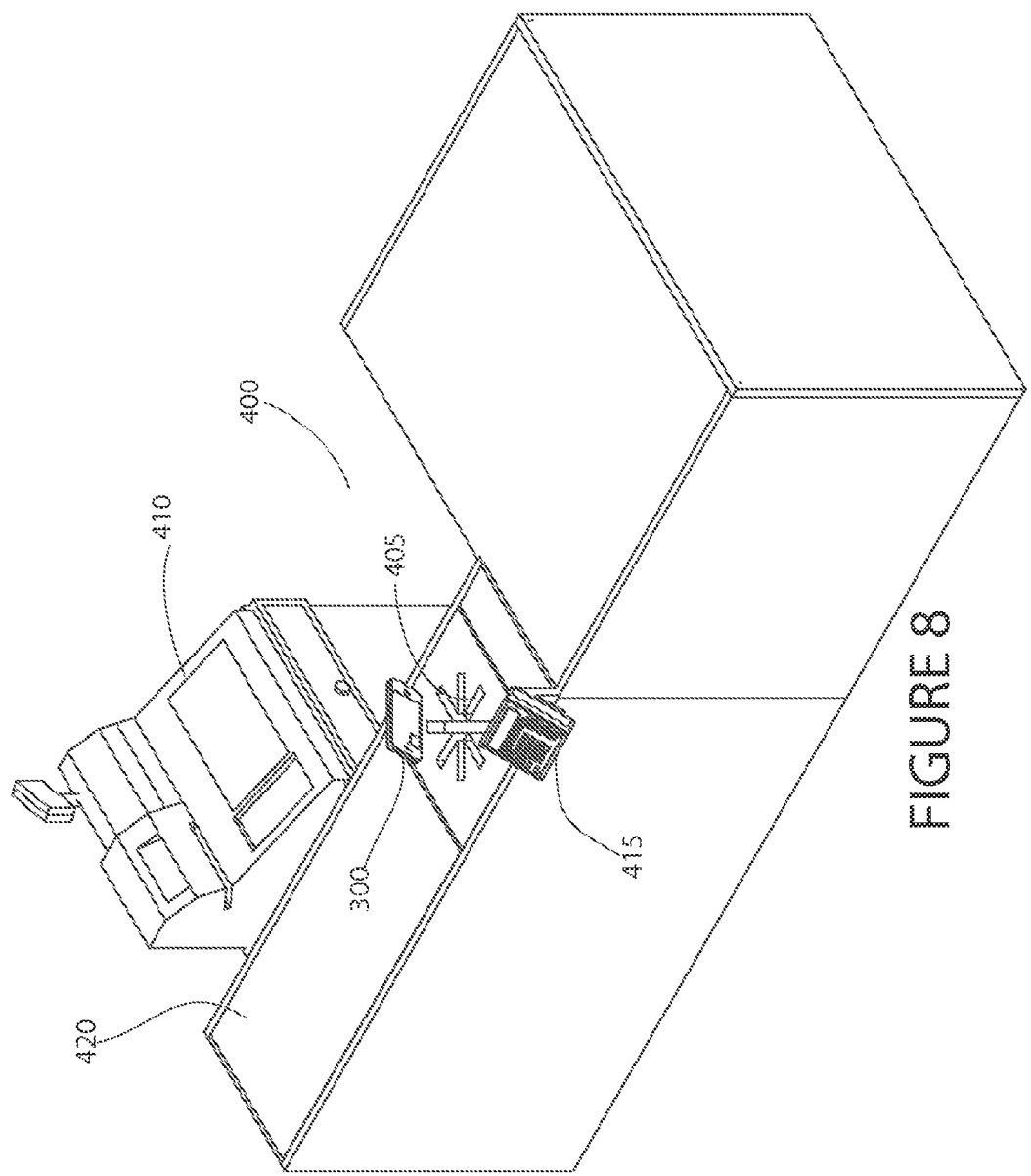
FIG. 8 provides a perspective view that conceptually illustrates a smart phone equipped with an exemplary synthetic barcode module at a point of sale according to principles of the invention.

Referring now to FIG. 7, an exemplary smart phone 300 according to principles of the invention includes a display 310, such as an AMOLED or active matrix RGB LCD, with a portion of the display 315 controllably illuminated to generate synthetic barcode output. The phone 300 is shown in use at a point of sale 400 (checkout lane) in FIG. 8. The point of sale 400 includes a laser scanner 405, over which the phone is positioned. The scanner 405 is a conventional fixed laser barcode scanner commonly used at grocery checkout lanes. However, the invention is not limited to such scanners. Rather the invention works with other scanners that respond to light reflected from a barcode, such as handheld scanner guns and the like. The scanner will interpret the light pulses from the display of the phone 300 as a scanned barcode. Additional accessories ate the point of sale are a register 410 and card reader 415.

The phone 300 stores data corresponding to payments. The payment data may be uploaded to the phone 300 wirelessly on demand from any remote source. Alternatively, the payment data may be uploaded to the phone from a paired personal computer during synchronization. The manner in which the payment data is provided to the phone 300 is not particularly important. Any method of supplying data in the form of audio files to the smart phone 300, may be utilized.

A client application executable on the phone 300 facilitates storage, selection and transmission of payment data. As discussed above, the client application may take the form of a media player, particularly an audio player, which is a software application for playing the audio files. In a particular preferred embodiment, the application includes a media library containing image files (e.g., thumbnails) and data corresponding to each audio file. The media player application displays information (e.g., thumbnails and text) associated with each audio file in a media library. The application may allow a user to organize and sort the audio files, such as by product category, expiration and amount. In a payment embodiment, where the audio files correspond to payments, then during checkout, a consumer using the application may review the stored payment data and select payments corresponding to purchased items. The selection may be made using the phone's 300 user interface.

At the appropriate time in the checkout process, the consumer may instruct phone 300 to emit synthetic barcodes corresponding to the selected payments. In response, the phone 300 demodulates barcode data from audio files corresponding to the barcodes. The signals are used by the microcontroller (e.g., microprocessor) of the phone drive the display controller in a manner to produce the synthetic barcode output. Light emitted from the display corresponds to a payment barcode. The barcode scanner 405 interprets the emitted pulses of light as light reflected from a barcode for the corresponding payment.

If there are several payment means, e.g., gift cards, credit cards, etc. . . . , the user may instruct the smart phone 300 to produce a synthetic barcode for the next payment after a payment has been read by the barcode scanner. Most barcode scanners provide a signal (e.g., an audible) beep to signify a successful read. Many scanners emit a distinctive beep (e.g., a 4 kHz 100 ms beep) that may be audibly detected by the phone 300 to indicate a successful scan. Upon sensing a beep indicative of a positive read, the phone may proceed with the next transmission. A microphone on the phone 300 may be used to detect the distinctive beep, to automatically advance to the next payment. This sequence of steps may be repeated until each desired payment has been used. The phone 300 may be configured to automatically emit pulses corresponding to the next payment according to a time schedule (e.g., 5 seconds apart) or based upon detection (e.g., audible detection) of a positive scan.

In sum, the invention provides an easy-to-use paperless wireless payment on demand system that works with conventional laser barcode scanners. Payments may be wirelessly retrieved, selected, and optically transmitted at any checkout lane equipped with a laser scanner.

An inherent advantage is that the primary readout technology (i.e., a barcode scanner) is ubiquitous and inexpensive. Another advantage is that the input interface and form of analog input is widely available. Yet another advantage is that the encoded information (e.g., payment barcode data) is communicated optically over a short range, providing secure communication. Yet another advantage is that the information may be updated and replaced using user input and/or communication capabilities of the phone. Still another advantage is that vast amounts of data may be stored on the phone. Furthermore, because of its compact configuration, a synthetic barcode module may be integrated with a phone and carried by a user at all times. Moreover, the total cost of ownership of such modules can be relatively low because the hardware components (e.g., an LED, a signal conditioner, a microcontroller and an LED driver) are all inexpensive and widely available in existing phones.

Figure 9:
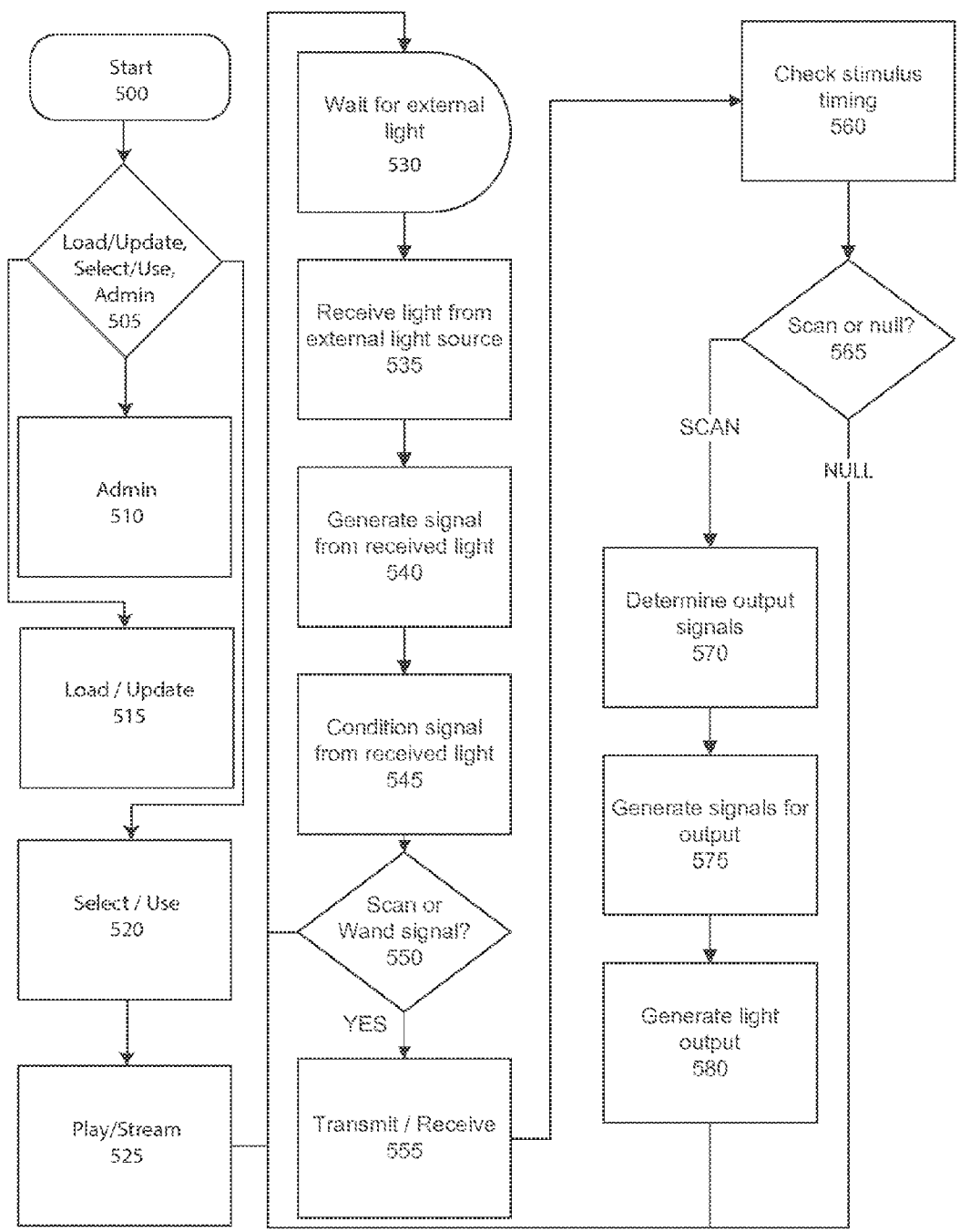
FIG. 9 provides a high level flowchart that conceptually illustrates steps of an exemplary synthetic barcode method according to principles of the invention.

Referring now to FIG. 9, a high level flowchart of steps of an exemplary synthetic barcode method according to principles of the invention is conceptually shown. The method starts in step 500 by launching a client application, such as an application on a mobile phone, and providing instructions via a user interface in step 505. Upon launching the application, a user is presented with a user interface, including user selectable commands. One type of command is Admin for administration 510. Upon receiving an administration instruction, the application provides controls for account management (e.g., setting user passwords and credit card details) and setting program preferences.

Account management functions include settings and parameters related to a user's account. By way of example, controls for entering and changing stored and default credit card details, passwords and user names associated with the application and an account may be provided.

After completion of administration functions control passes back to a start screen 500. A user may select a payment means as in step 515 by one or more payment means. The payment means (e.g., specific card) may be selected from all available payment means. More than one payment means, such as a gift card and a credit card, may be selected for a particular transaction.

After completion of the selection function control passes back to the start 500. A user may then use available payment data as in step 520 by selecting a use command. The use command causes the device 300 to determine the data for driving the synthetic barcode module in a manner to generate the selected payment data in a series of barcodes. The use command begins the transmission process, at which time the synthetic barcode optical flashes are emitted. Optionally, a next command instructs the application to transmit a next payment data from the queue, if a series of payment means are queued. In one embodiment, a next synthetic barcode is automatically transmitted after the previous synthetic barcode has been successfully transmitted.

In the case of audio encoded payment data, step 525 entails playing an audio file corresponding to a barcode. Playing may be accomplished using any compatible media playing application or module. Upon being played, analog audio signals are output. The analog signals correspond to the barcode. The phone demodulates the analog signals and generates optical driver signals to optically emulate the barcode. This step is performed only where the data is encoded in an audio file.

Steps 530 to 580 comprise steps of an exemplary transmission process. As an initial step, the module (i.e., the phone 300 equipped as described above), optionally, may wait to receive light from an external source, as in step 530. To conserve power, a system implementing the method may sit idle until light is received, i.e., until interrogated. Light is received from an external source, which may include laser light emanating from a barcode reader or ambient light emitted from other nearby light sources, as in step 535. The light may be collected by a light transmission means such as a light pipe, lens or mirror, and then transmitted to an optical sensor, which may be an LED used also as an emitter, a photodiode, a CCD, a CMOS camera, or some other photo receiver. Next, the sensor generates a signal corresponding to the received light, as in step 540. A signal conditioner receives and conditions the signal from the sensor by improving the signal to noise ratio and supplying logic level signals to a microcontroller, as in step 545.

The system discriminates between a scanning signal and a signal from another source of light. First, the system is configured to discriminate a signal corresponding to a laser pulse of a barcode scanner from signals generated by other light sources, such as ambient light, based upon signal characteristics, such as stimulus timing or voltage rise time, as in step 550. If the signal does not correspond to a signal from a scanner, then control returns to step 530. However, if a signal corresponds to a signal from a scanner, then control proceeds to subsequent steps. Optionally, the discrimination step comprises receiving light pulses as in step 555. In step 560, stimulus timing is checked. That entails determining if the signal being received has a regular or determined pulse rate. For example, laser scanners scan a laser beam back and forth across a bar code. The scanning rate is typically fixed at about 100 scans per second (or more) for a particular laser scanner. To the module, the scanning laser of a barcode scanner will appear as a light pulse recurring in regular fixed intervals of time (e.g., once every 0.01 seconds). Thus, light from a barcode scanner may be readily distinguished by determining if the light pulse is repeatedly detected at a fixed frequency (i.e., at a fixed amount of time between detected light pulses). If the light received does not correspond to a barcode scanner, then step 565 passes control back to step 530.

Based upon the stimulus timing, such as pulse rates or frequencies, a determination is made if the emitting unit is a barcode scanner or not as in step 565. For a scanner, control proceeds to scanning mode steps 570-580. In scan mode, the received light prompts the system to emit optical output for a scanner/reader to read. If the signal does not correspond to a signal from a scanner, then in "null mode" control returns to step 530. Null mode may be triggered due to any ambient or incompatible light source. Thus, unless and until signal characteristics correspond to a compatible scanner, the module will not communicate data, which enhances security and conserves power.

In scan mode, a programmed microcontroller receives the conditioned signals and determines output signal stream(s), as in step 570. An LED driver receives the signals that are output from the microcontroller and supplies a correct amount and timing of drive current to an LED light source to emulate light reflected from a determined scanned barcode, as in step 575. The LED light source receives the drive current from the LED driver and emits light to emulate light reflected from a determined scanned barcode, as in step 580. Advantageously, in a particular exemplary embodiment of the invention, the device that emits the light in step 580 may be an LED and the same device (i.e., same LED) used to sense the light and generate a signal from the received light in steps 555. As another advantage, in another particular exemplary embodiment, one or more light pipes may facilitate the capture (i.e., receipt) and transmission of light from an external source, as in step 555.

Figure 10:
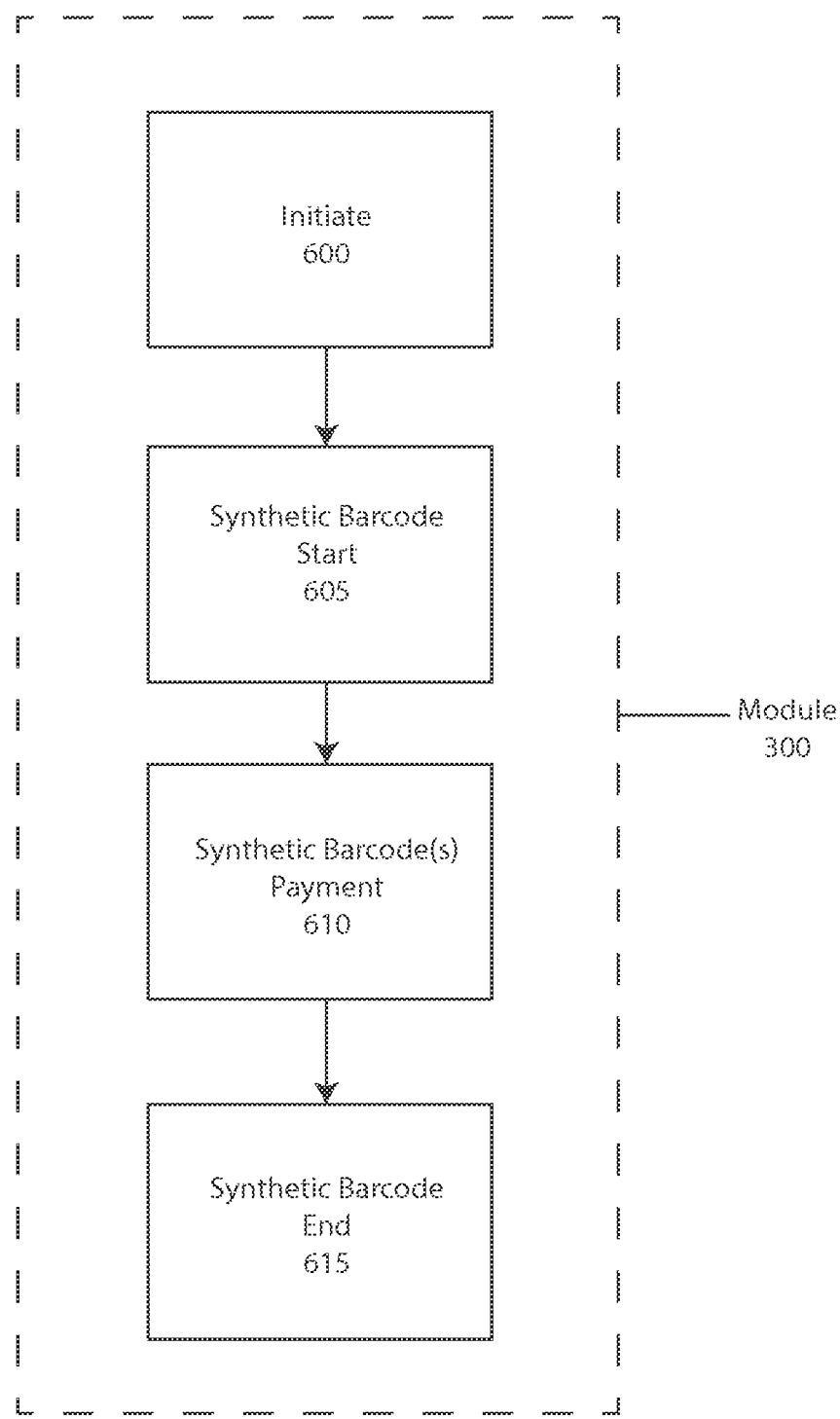
FIG. 10 is a flowchart that conceptually illustrates steps of a synthetic barcode payment process via a synthetic barcode module according to principles of the invention.

Referring now to FIG. 10, a flowchart that conceptually illustrates steps of a synthetic barcode payment process via a synthetic barcode module according to principles of the invention is provided. To initiate the process as in step 600, a user starts an app on a smart phone and selects a payment means. Then the user selects a control to start the payment process, as in step 605. Whereupon, in the presence of a barcode scanner, the synthetic barcode module 300 begins to emit light pulses, which are modulated to emulate light reflected from scanned barcodes, as in step 610. The light pulses continue until all barcodes comprising the selected payment means have been communicated. After completion, the user may close the app, or the app may automatically close, as in step 615. Prior to or in connection with closing the user may enter information related to the transaction. For example, the amount charged, the goods or services procured, and the place where the charge was made may be entered. In this manner, the app may store information relating to the transaction for reconciliation with the user's credit card statement.

Figure 11:
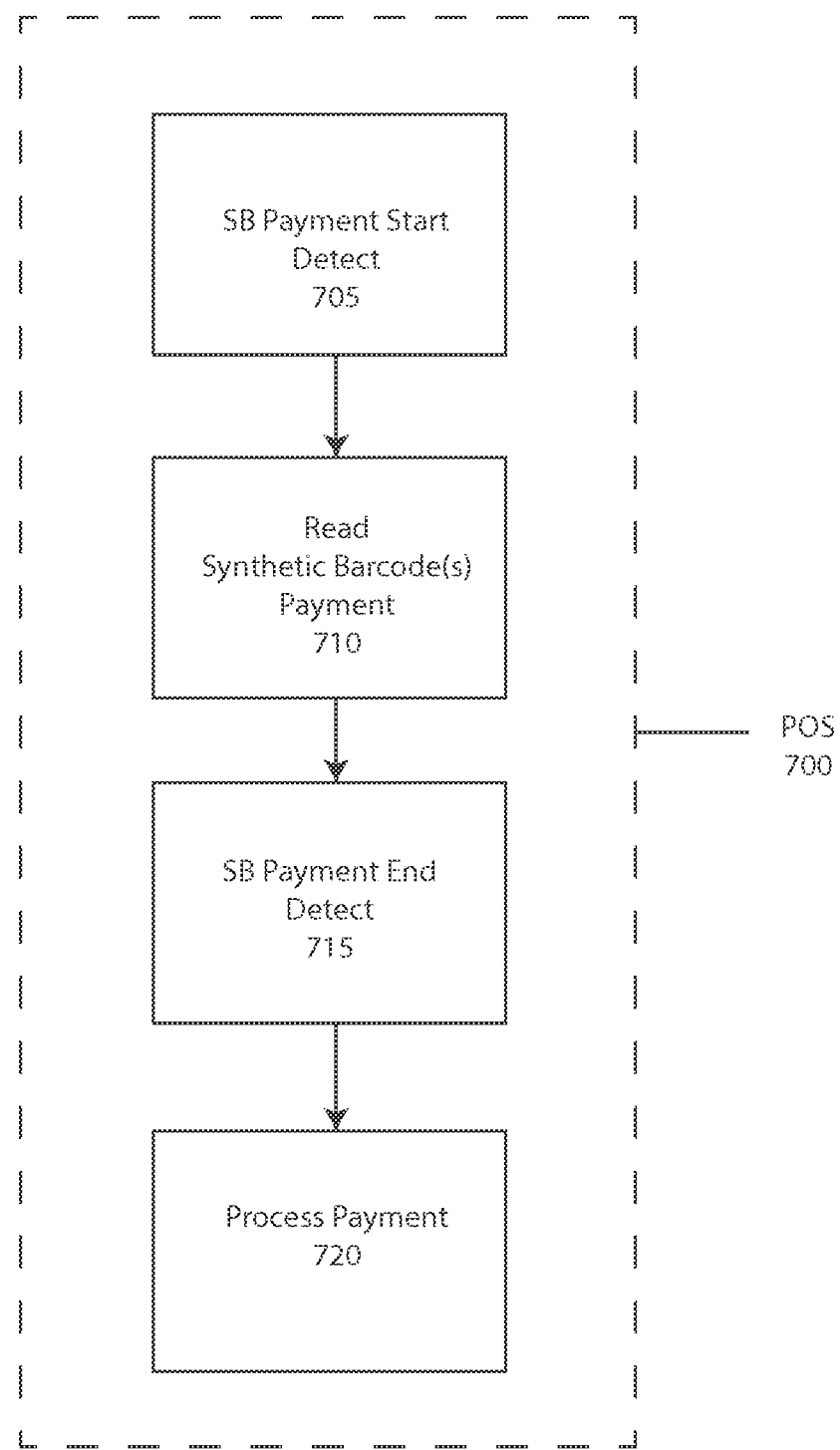
FIG. 11 is a flowchart that conceptually illustrates steps of a synthetic barcode payment processing process via a point of sale terminal according to principles of the invention.

Referring now to FIG. 11, a flowchart that conceptually illustrates steps of a synthetic barcode payment processing process via a point of sale terminal 700 according to principles of the invention is provided. A user notifies a sales person that he or she will pay by synthetic barcode. The sales person selects a synthetic barcode payment control, which instructs the barcode scanner to read a series of barcodes comprising payment information. Alternatively, the barcode scanner of the point of sale system detects that the scanned information pertains to a payment, as in step 705. Whereupon, the barcode scanner reads synthetic barcodes emitted by the module 300, as in step 710. The point of sale system 700 may detect when the last synthetic barcode has been received, or the sales person may instruct the point of sale system that the synthetic barcode has been received, as in step 715. Next, the payment is processed by the point of sales system 700 by determining payment information from the scanned synthetic barcodes, which may be in encrypted form. The payment information is processed by the point of sale system in the same manner that a swiped credit card or gift card is processed, as in step 720.

Figure 12:
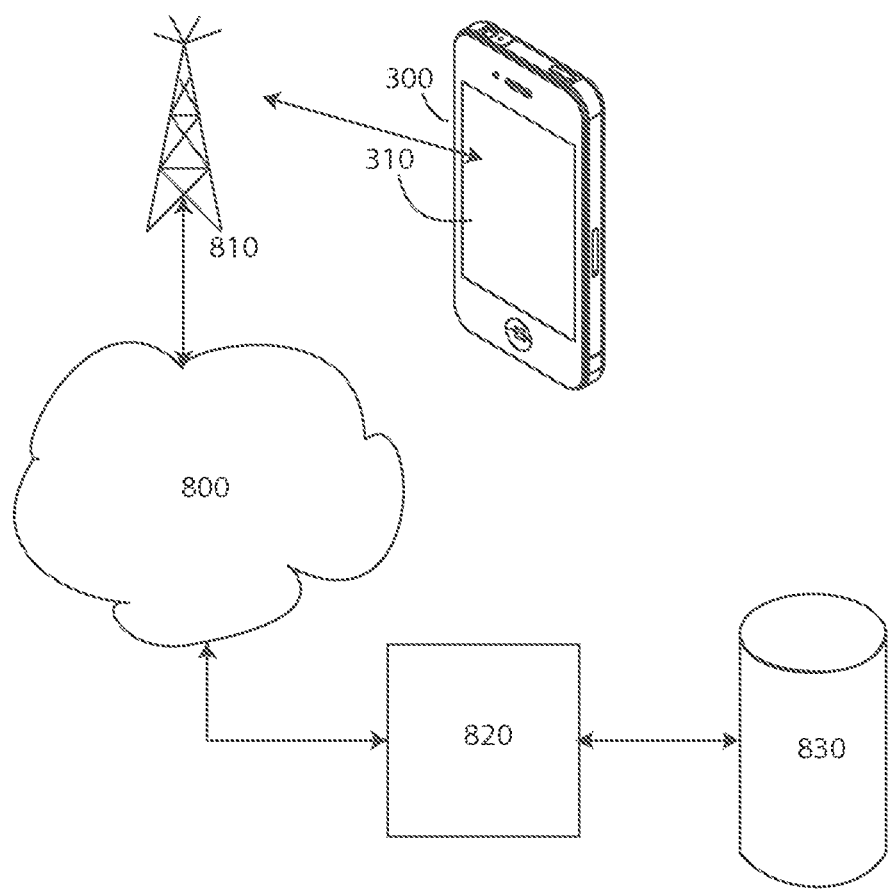
FIG. 12 is a high level block diagram that illustrates components of a networked system for communicating payment data according to principles of the invention.

Referring now to FIG. 12, a high-level block diagram of a system in accordance with an exemplary implementation of the invention is shown. A server 820 hosts software for managing payment data (e.g., gift cards) on a data store 830 and enabling such data to be communicated to various end user devices such as a smart phone 300, equipped with a display 310. While FIG. 12 shows one server 820 and one end user device 300, it is understood that the system may include any number of servers and end user devices. Additionally, the synthetic barcode module may comprise a part of the smart phone or an accessory attachable to the smart phone. Furthermore, a server may comprise a standalone computer or a plurality of operably coupled computing devices. The invention is in not limited to the exemplary networked system shown in FIG. 12.

Gift card payment data may be communicated from the server 820 using any compatible communication means, such as network connection via a LAN, WAN or the Internet 800, RF communication such as smart phone communication 810, or other means of wired or wireless communication. In one embodiment, the data may be communicated to an end-user's personal computer, to which the end user's device (e.g., phone 300) may be synchronized, thus receiving the data. In another embodiment, the data may be communicated from the server 820 via the network to the end user device 300.

The server and personal computers described above may be comprised of commercially available computers, hardware and operating systems. Indeed, the aforementioned computing devices are intended to represent a broad category of computer systems capable of functioning in accordance with the present invention. Of course, the computing devices may include various components, peripherals and software applications provided they are compatible and capable of performing functions in accordance with the present invention. The computing devices also include information, documents, data and files needed to provide functionally and enable performance of methodologies in accordance with an exemplary embodiment of the invention.

A firewall may be located between computers to protect against corruption, loss, or misuse of data. The firewall may limit access and prevent corruption of sensitive data. Thus, a server may be configured/authorized to access and receive only data that is necessary for the legitimate functions of the server. The firewall may be comprised of any hardware and/or software suitably configured to provide limited or restricted access to a computer. The firewall may be integrated within the computer or comprise another system component, or may reside as a standalone component.

Figure 13:
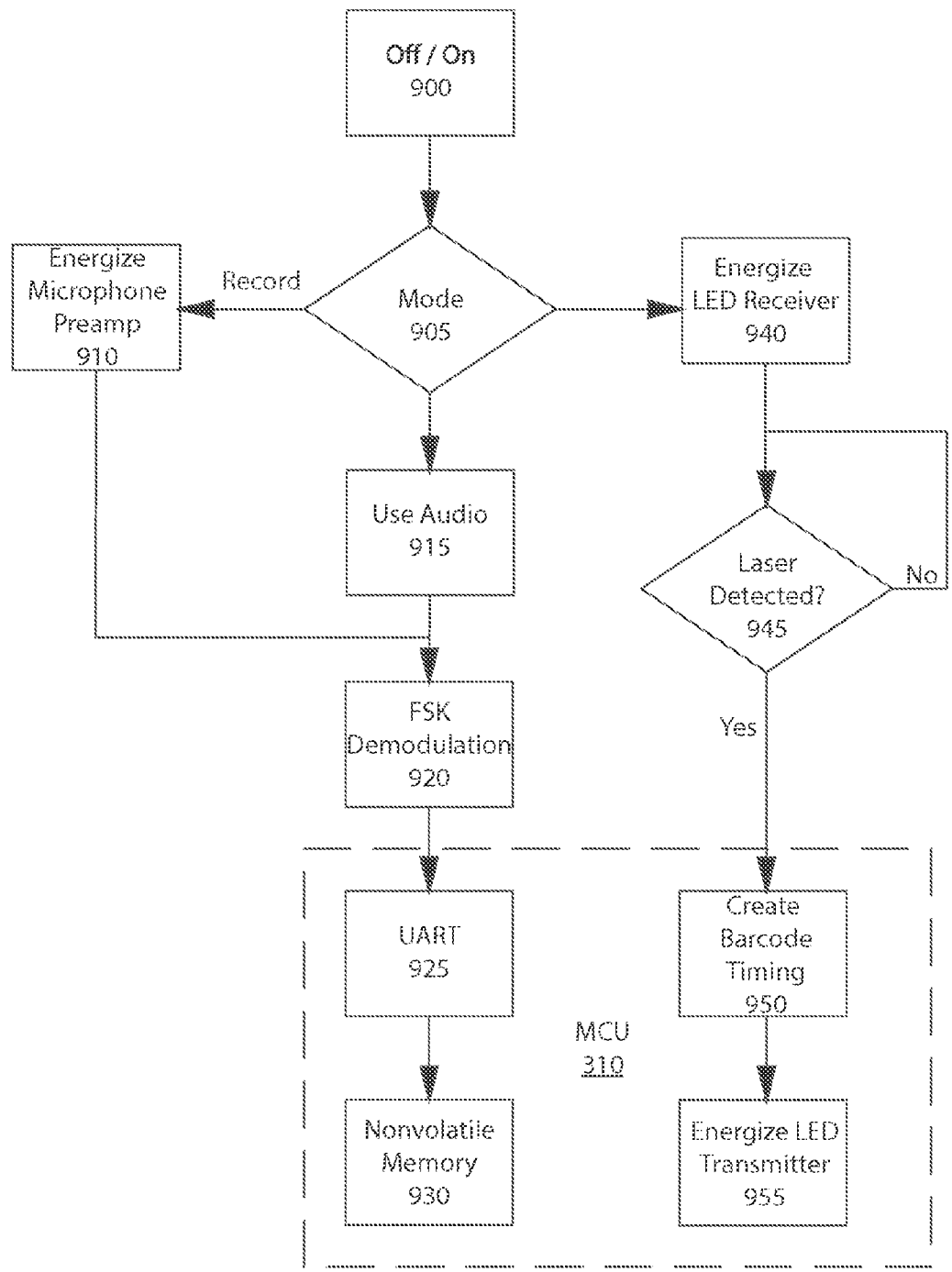
FIG. 13 is a flowchart that conceptually illustrates steps of a synthetic barcode payment process via an audio plug-in synthetic barcode module according to principles of the invention.

Now referring to FIG. 13, a flow chart that conceptually illustrates modes of operation of a synthetic barcode module according to principles of the invention is provided. An input mode, steps 910-930, entails transforming analog audio input into optical output data. An output mode, steps 940-

955, entails generating optical output based upon the optical data when a barcode scanner has been detected. In step 900, a synthetic barcode module according to principles of the invention is activated or awaken from sleep or hibernation mode. Activation or awakening may be accomplished by user selection of a switch (e.g., a power on switch) or sensing that the module has been plugged into an audio output jack of a compatible device. When the module is activated, steps of the input mode or output mode may proceed, as illustrated in step 905.

In input mode, analog audio input may be received from an energized microphone preamp, as in step 910, or from an audio output jack, as in step 915. In the case of microphone input 910, the synthetic barcode module or the compatible device (e.g., phone) may be equipped with a microphone and preamp circuitry. If the module is equipped with a microphone, the microphone may be communicatively coupled to the microcontroller. If the compatible device is equipped with a microphone, recorded output may be communicated to the module via the audio output jack. The analog audio input comprises modulated audio, such as, but not limited to, frequency modulated audio according to a frequency-shift keying (FSK) modulation scheme in which digital information is transmitted through discrete frequency changes of a carrier wave. The analog audio input is demodulated in step 920, such as by FSK demodulation or another demodulation methodology that is compatible with the modulated analog audio input. In step 925, a Universal Asynchronous Receiver/Transmitter (UART) assembles demodulated bits of data into complete bytes. The bytes of data constitute optical timing data. Many of the aforementioned components may be provided as part of one or more integrated circuits contained in the phone 300, or hardware or software equivalents thereof.

In output mode, a photo receiver (e.g., CCD, CMOS, light sensor) is used as a receiver, as in step 940. The module detects the presence of a laser scanner. By way of example, an HeNe laser found in older laser barcode scanners and a laser diode used in modern barcode scanners have an operation wavelength ($\lambda$) of about 930 to 950 nm, in the red portion of the visible spectrum. A Super High Brightness Red LED, which emits pure red to He—Ne laser red light, with a peak wavelength ($\lambda$) between 650 and 670 nm, may be sensitive to red light from such a laser barcode scanner. An infrared LED may be used to sense light emitted from and emulate light reflected to an IR barcode scanner. If sensed light is not light from a laser barcode scanner, control returns to step 945. If sensed light is light from a laser barcode scanner, the microcontroller supplies a correct amount and timing of drive current, as in step 950, to energize an LED light source, as in step 955, to emit light that emulates light reflected from a barcode.

The invention offers several advantages. One advantage of the invention is that the synthetic barcode module may communicate a wide range of data, including payment data, from an end user device such as a smart phone to any compatible barcode scanner. Various sets of data may be stored and communicated sequentially. By way of example and not limitation, a synthetic barcode module may communicate an id for the end user as well as other information about that end user, in addition to payment card data and gift card data. Versatility is another advantage. The synthetic barcode module is adaptable to environments equipped with barcode scanners.

In an exemplary implementation, a synthetic barcode communicates information contained on or associated with a credit card, such as the information encoded on the magnetic stripe of a credit card. The magnetic stripe of a credit card contains three tracks. Tracks one and three are typically recorded at 210 bits per inch (8.27 bits per mm), while track two typically has a recording density of 75 bits per inch (2.95 bits per mm). Each track can either contain 7-bit alphanumeric characters, or 5-bit numeric characters. Magnetic stripes following these specifications can typically be read by most point-of-sale hardware. Examples of cards adhering to these standards include ATM cards, bank cards (credit and debit cards including VISA and MasterCard), gift cards, loyalty cards, driver's licenses, telephone cards, membership cards, electronic benefit transfer cards (e.g. food stamps), and nearly any application in which value or secure information is not stored on the card itself. Many video game and amusement centers now use debit card systems based on magnetic stripe cards. The invention may be used with any such card, all of which constitute payment cards.

As mentioned above, there are up to three tracks on magnetic cards known as tracks 1, 2, and 3. Track 3 is virtually unused by the major worldwide networks, and often is not even physically present on the card by virtue of a narrower magnetic stripe. Point-of-sale card readers almost always read track 1, or track 2, and sometimes both, in case one track is unreadable. The format for track one is: start sentinel—one character; format code—one character (alpha only); primary account number—up to 19 characters; separator—one character; country code—three characters; name—two to 26 characters; separator—one character; expiration date or separator—four characters or one character; discretionary data—enough characters to fill out maximum record length (79 characters total); end sentinel—one character; and longitudinal redundancy check (LRC)—one character. The format for track two is as follows: start sentinel—one character; primary account number—up to 19 characters; separator—one character; country code—three characters; expiration date or separator—four characters or one character; discretionary data—enough characters to fill out maximum record length (40 characters total); and LRC—one character.

Most point of sale systems are configured to scan/read UPC or EAN codes, which consists of a scannable strip of black bars and white spaces, above a sequence of numerical digits. By way of example and not limitation, a UPC-A barcode consists of a scannable strip of black bars and white spaces, above a sequence of 12 numerical digits. The digits and bars maintain a one-to-one correspondence. Each digit is represented by a pattern of two bars and two spaces. The bars and spaces are variable width; they may be one, two, three, or four modules wide. The total width for a digit is always seven modules. A complete UPC-A includes 95 modules: the 84 modules for the digits (L and R) combined with 11 modules for the start, middle, and end (S, M, and E) patterns. The S and E patterns are three modules wide and use the pattern bar-space-bar; each bar and space is one module wide. The M pattern is five modules wide and uses the pattern space-bar-space-bar-space; each bar and space is one module wide.

The scannable area of every UPC-A barcode follows the pattern SLLLLLLMRRRRRRE, where the S (start), M (middle), and E (end) guard bars are represented exactly the same on every UPC and the L (left) and R (right) sections collectively represent the 12 numerical digits that make each UPC unique. The first digit L indicates a particular number system to be used by the following digits. The last digit R is an error detecting check digit that allows some errors in scanning or manual entry to be detected. The non-numerical identifiers, the guard bars, separate the two groups of six digits and establish timing.

As a result of the limits of standard UPC and EAN barcodes, more than one synthetic barcode may be required to convey the payment information or account information from which the payment information may be obtained. This is possible because each barcode symbology includes start, middle and end patterns. As the start and end of a UPC code are defined, a series of UPC codes may be communicated optically to represent all of the information encoded on a magnetic stripe track. The first in the series of synthetic barcode may indicate that it is the start of a payment sequence. The last in the series of synthetic barcode may indicate that it is the end of a payment sequence. The synthetic barcodes between the first and last may convey data corresponding to Magnetic Stripe Track 1 and/or Magnetic Stripe Track 2. Alternatively, the synthetic barcodes between the first and last may convey data corresponding to an account which may be accessed through the point of sale system to process payment. Thus, the series of synthetic barcodes communicated by a synthetic barcode module according to principles of the invention comprise payment card data for a transaction.

Each pair of numbers communicated by a synthetic barcode according to principles of the invention represent a character. By way of example and not limitation, the character may be a number (0-9) or a letter of an alphabet (e.g., the English alphabet—A through Z or a foreign alphabet) or punctuation (e.g., a hyphen) or accented letters (e.g., ö and ń). The pair of numbers allow mapping to 100 distinct characters from 00 to 99, covering all digits from 0 to 9, all 26 letters of the English alphabet (not case sensitive), plus up to sixty four additional characters, which may include punctuation, special symbols, accented letters and letters of a foreign alphabet.

In accordance with the principles of the invention, synthetic barcodes produced using a synthetic barcode module may be used to convey the track 1 and/or track 2 information of a magnetic stripe on a payment card. The information is encoded in a series of barcodes (e.g., UPS or EAN formatted barcodes). Each pair of numbers in the barcode may represent a character of the information of the track being conveyed. To convey 81 characters of track 1 using two digits per character requires 14 UPC-A 12 digit barcodes, which may be communicated rapidly in succession. To convey 41 characters of track 2 using two digits per character requires 7 UPC-A 12 digit barcodes, which may be communicated rapidly in succession. As conventional laser barcode scanners at a point of sale are capable of scanning at least 100 lines per second, often several times that amount, depending upon the particular POS hardware, the data may be optically transmitted at checkout in about the same time or less than it would take to swipe a card.

Figure 14:
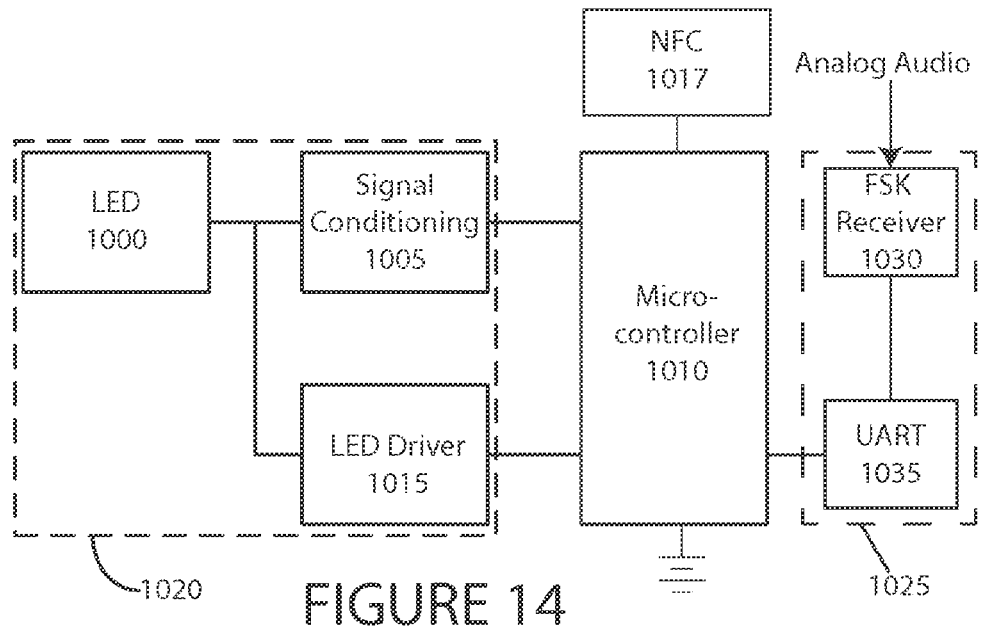
FIG. 14 provides a high level block diagram of components of an exemplary embodiment of an audio plug-in synthetic barcode module assembly according to principles of the invention.

As conceptually illustrated in FIG. 14, a plug-in audio embodiment of an exemplary synthetic barcode module comprises an assembly that is intended to be the target of the standard point of sale barcode scanners, such as those used at checkout lanes. An LED 300 serves as both an optical sensor (i.e., photodiode) and light source. The LED 1000 may be very small. The LED 1000 will generate an electrical signal upon exposure to the direct laser scanning beam. In a preferred embodiment, the LED is configured to operate in "short circuit mode" and generate a current (e.g., a current measured in μA) in response to incident light. While an LED is generally not an efficient photocell, in the presence of a laser scanner an LED will produce a sensible signal, e.g., enough microamps at enough volts to operate an amplifier or logic gate. As a photodiode, the LED is sensitive to wavelengths equal to or shorter than the predominant wavelength it emits. An HeNe laser found in older laser barcode scanners and a laser diode used in modern barcode scanners have an operation wavelength (λ) of about 6100 to 650 nm, in the red portion of the visible spectrum. Thus, for example, a Super High Brightness Red LED, which emits pure red to He—Ne laser red light, with a peak wavelength (λ) between 650 and 670 nm, will be sensitive to red light from a laser barcode scanner. Similarly, an infrared LED may be used to sense light emitted from and emulate light reflected to an IR barcode scanner. The LED can be multiplexed, such that it can be used for both light emission and sensing at different times. As both an emitter and detector of light, the single LED can be used to achieve bidirectional communications with another device. Operating as a half-duplex transceiver, the LED enables optical programming of a module according to principles of the invention. Although one LED 1000 is shown in FIG. 10, those skilled in the art will appreciate that in certain embodiments a plurality of LEDs 1000 may be utilized, at least one of which serves as both a light emitter and a sensor, within the scope of the invention.

A signal conditioning circuit or device 1005 (i.e., "signal conditioner") improves the signal to noise ratio from the LED 1000 and supplies logic level signals to a microcontroller 1010 when a scanning laser is observed by the LED 1000. The signal conditioning circuitry is configured to receive input from the LED and detect (e.g., filter) a weak signal (e.g., a few microamps) generated by the LED 1000, discriminate the laser pulse form from that of other light sources (e.g., due to voltage rise time), and then adjust the signal voltage to the input level required by the microcontroller 1010. Signal conditioning entails processing input analog signals from the LED 1000 and generating output signals (e.g., digital logic level signals) to meet the requirements of the microcontroller 1010 for further processing. The signal conditioning may include amplification, filtering, converting, range matching, isolation and any other processes required to make output from the LED 1000 suitable for processing by the microcontroller 1010 after conditioning. Filtering separates noise from the portion of the signal frequency spectrum that contains valid data. Amplification increases the resolution of the inputted signal, and increases its signal-to-noise ratio. Optionally, signal isolation may be used to isolate possible sources of signal perturbations and protect the microcontroller. The signal conditioning circuit may also include an analog-to-digital converter (ADC) configured to convert the input analog current to digital logic level signals representative of the magnitude of the input current. The signal conditioning circuit 1005 has a high enough input impedance that it is not affected by the drive voltage delivered to the LED 1000 by the LED driver 1015.

In an exemplary embodiment, the signal conditioning circuit 1005 uses amplification and a high pass filter to discriminate a laser pulse form from that of other light sources based upon signal amplitude and rise time. Illustratively, the signal conditioning circuit 1005 may be configured to handle as a laser pulse any signal with an amplitude and rise time of about (0.1 mW/mm2)/100 μs, or a greater amplitude or a quicker rise time. Skilled artisans will appreciate that for a given LED, tests may be performed using a variety of ambient and laser light sources to determine a workable amplitude and rise time for discriminating a laser pulse form from that of other light sources.

The microcontroller 1010 is a programmable integrated circuit comprised of a CPU with support features, such as an oscillator, timer, watchdog, and serial and analog I/O. Program memory, such as memory in the form of flash or ROM is included as well as a some RAM. The microcontroller 1010 is configured to respond to signals from the signal conditioning circuit 1005. The microcontroller 1010 receives conditioned signals via the signal conditioning circuit 1005. The microcontroller 1010 may include an analog to digital converter (ADC) to convert input analog voltage (or current) continuous signals to discrete digital data. The microcontroller 1010 may also include a digital-to-analog converter (DAC) to perform the reverse operation for output signals. The microcontroller 1010 is programmed to cause the LED driver to energize the LED and transmit light pulses in a fashion to simulate the reflections from printed barcodes using the EAN-110, UPC-A, or other standard barcode systems, so that the emitted pulses can be read using a conventional barcode reader. The microcontroller 1010 may be comprised of any suitable controlling device, such as a logic circuit, a microprocessor, a combination of these elements, and the like.

The microcontroller 1010 may have an internal clock oscillator as the time base for all operations. Alternatively, a crystal and associated circuitry may be utilized for a timing base. It may also have internal memory, which may store programming for the module and a table that determines the time and duration the LED 1000 must be illuminated in order to generate light pulses comprising the synthetic barcode signal. Timing data for barcode synthesis may reside in the microcontroller 1010 from manufacture or may be downloaded at some later point through any type of communications medium, e.g. RS2102, RF data link, optical data link, etc.

The microcontroller 1010 sends control signals to the LED driver 1015 to make the LED 1000 turn on and off with sufficient brightness, and at the correct timing, for the emitted light to be interpreted by a standard laser barcode scanner as the signal from a printed barcode. By way of example and not limitation, the microcontroller 1010 may modulate the light emission period by sending control signals to the LED driver 1015.

In an exemplary embodiment, the microcontroller 1010 causes the LED driver 1015 to cause the LED 1000 to emit light and cease emission for determined periods of time, according to a determined symbology. The specification of a symbology includes the encoding of the single digits/characters of the message as well as the start and stop markers into bars and space, the size of the quiet zone required to be before and after the barcode as well as the computation of a checksum. Illustratively, x millisecond periods (representing white spaces between bars) during which light is emitted and y millisecond periods (representing black bars) during which no light is emitted may be utilized to emulate light reflected from a barcode. The variable x may vary from a few milliseconds (e.g., 2 or 4 milliseconds) to multiples of that amount (e.g., 1, 2, 10 or 4 times that amount), depending upon the width of the space represented. Likewise, y may vary from a few milliseconds (e.g., 2 or 4 milliseconds) to multiples of that amount (e.g., 1, 2, 10 or 4) times that amount, depending upon the width of the bar represented. The timing works well across a wide range of barcode scanners. The barcode scanner interprets the emitted light as an analog signal waveform of more or less rectangular-shaped pulses.

The LED 1000 is a current-driven device whose brightness is proportional to its forward current. Forward current can be controlled either by applying a voltage source and using a ballast resistor or, preferably, by regulating LED current with a constant-current source, such as an LED driver 1015. The LED driver 1015 supplies a correct amount of current to drive the LED 1000. While a separate LED driver 1015 is shown, the LED driver 1015 could optionally be included or integrated into the microcontroller 1010. The LED driver 1015 eliminates changes in current due to variations in forward voltage, which translates into a constant LED brightness. Optionally, the LED driver 1015 may enable Pulse Wave Modulation (PWM) dimming, which entails applying full current to the LED at a reduced duty cycle and at a high enough frequency (e.g., >100 Hz) to avoid pulsing that is visible to the human eye. In some embodiments, the LED driver 1015 may be comprised of one or more pins on the microcontroller 1010 with a current limiting resistor. A switched current source or current sink may also be used to drive the LED 1000.

The audio interface 1025 is an analog audio plug 510 that mates with the receptacle 705 of an analog audio jack of an electronic device by plugging into the device. By way of example and not limitation, a two contact TS connector (tip, sleeve), a three contact TRS connector (tip, ring, sleeve) or a four contact TRRS connector, also called an audio jack, stereo plug, mini-jack, or headphone jack may be used. A three- or four-conductor 2.5 mm analog audio jack is widely used on smart phones, providing mono (three conductor) or stereo (four conductor) sound and a microphone input.

The audio interface 1025 receives and demodulates the analog audio signals, producing digital output that can be processed by the microcontroller. In a particular preferred embodiment, the audio interface includes a frequency shift keying (FSK) receiver 1030 (or transceiver), which is signal processing circuitry that receives the analog audio input and generates binary data output. The binary data comprises the zeros and ones modulated in the analog audio signal. This data stream may include error detection and/or correction codes. The FSK receiver 1030 may comprise discrete circuitry, an integrated circuit and/or an integral functional component of the microcontroller 1010.

In a particular preferred embodiment, the audio interface 1025 also includes a universal asynchronous receiver (UART) 1035. The UART 1035 receives demodulated binary serial digital data (i.e., the ones and zeros) from the FSK receiver 1030 and converts the serial data into parallel data words that can be utilized by the microcontroller 1010. Output of the UART 1035 is supplied to the microcontroller. A conventional UART design, including known variable baud rate designs can be used to implement UART 1035. The UART 1035 may comprise discrete circuitry, an integrated circuit and/or an integral functional component of the microcontroller 1010.

A synthetic barcode module according to the invention includes an audio interface 1025 that interfaces the microcontroller 1010 with the analog output conductors of the audio jack. An exemplary synthetic barcode module according to the invention does not require the microphone input. If an audio jack includes a microphone input, the module may not use it. Alternatively, the module may contain a microphone coupled to the microphone input, for example, if the electronic device and/or module will respond to external audio (e.g., speech or audio output from a barcode scanner). The microcontroller 1010 includes, either as an integral component or as a peripheral component, an A/D converter that converts the analog audio to digital data corresponding to a barcode (i.e., barcode data).

In operation when a laser barcode scanner hits the LED 1000, the signal conditioning circuit 1005 communicates filtered and amplified signals to the microcontroller 1010, which causes the LED driver 1015 to drive the LED 1000 in a manner that emits a predefined series of light flashes corresponding to light reflected to a scanner upon scanning a barcode. When that series of light flashes has been sent, the system module waits for another hit from a scanning laser beam to repeat the process. The timing of the transmitted light pulses may be preprogrammed in the microcontroller 1010.

The synthetic barcode module sequentially communicates barcode data via a communication path (e.g., optical communication path). Thus, barcode data corresponding to payments may be communicated via an optical communication path using the synthetic barcode module.

Figure 15:
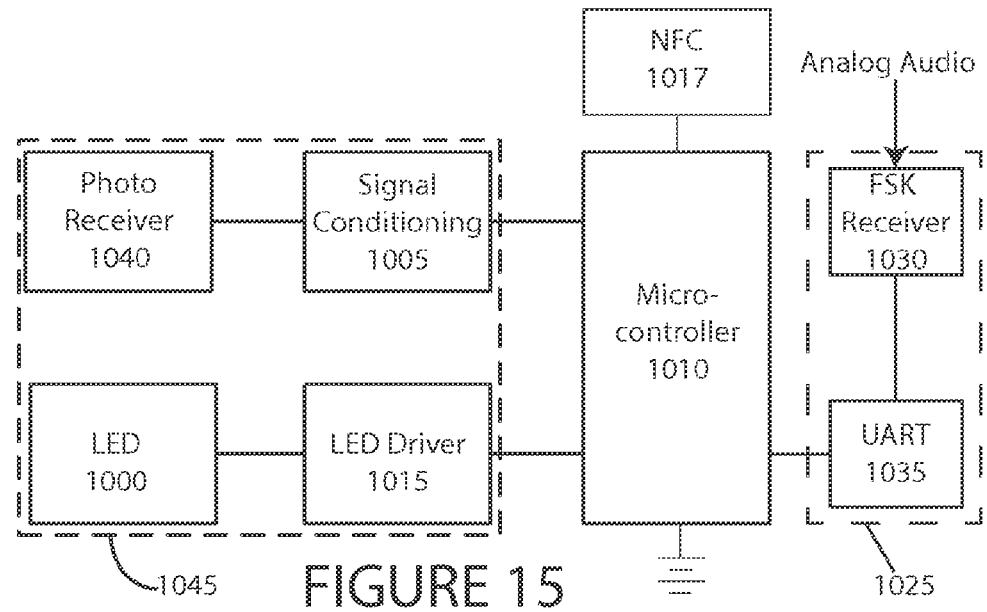
FIG. 15 provides a high level block diagram of components of another exemplary embodiment of an audio plug-in synthetic barcode module assembly according to principles of the invention.

Although one dual function LED 1000 is shown in FIG. 14, those skilled in the art will appreciate that a plurality of LEDs 1000 may be utilized, at least one of which is configured to serve as a sensor. Alternatively, as shown in FIG. 15, a separate photo receiver 1040 may be utilized. The photo receiver 1040 may be comprised of any compatible photo detector capable of sensing electromagnetic energy in the visible and/or infrared parts of the spectrum, as emitted by a barcode scanner. Nonlimiting examples of suitable photo receivers include photoresistors which change resistance according to light intensity, photovoltaic cells which produce a voltage and supply an electric current when illuminated, photodiodes which can operate in photovoltaic mode or photoconductive mode converting light into either current or voltage, and phototransistors incorporating one of the above sensing methods. The photo receiver 1040, which is dedicated to sensing light emitted from a barcode scanner, may be responsive to wide range of wavelengths of light. Illustratively, photodiodes are available for visible through infrared wavelengths. A silicon photodiode may provide a spectral response from wavelengths of 190 to 1100 nm, while a germanium photodiode may offer a spectral response from 1040 to 1700 nm and an Indium gallium arsenide photodiode may provide a spectral response from about 800 to 2600 nm.

Each embodiment shown in FIGS. 14 and 15 includes a synthetic barcode circuit 1020, 1045 operably coupled to a microcontroller 1010. The LED 1000 of the synthetic barcode circuit 1020 of the embodiment shown in FIG. 10 is operably coupled to both the signal conditioning circuit 1005 and LED driver 1015. In that embodiment, the LED 1000 functions as both an emitter and a photodiode. The synthetic barcode circuit 1045 of the embodiment shown in FIG. 15 includes the LED 1000 operably coupled to the LED driver 1015 and a photo receiver 1040 operably coupled to the signal conditioning circuit 1005. In that embodiment, the LED 1000 functions only as an emitter and the photo receiver 1040 functions as an optical-to-electrical transducer. Thus, the difference between the two embodiments is that the photo receiver 1040 is configured to sense optical input in the synthetic barcode circuit 1045 of the embodiment shown in FIG. 15, while the LED 1000 performs both sensing and emission in the synthetic barcode circuit 1020 of the embodiment shown in FIG. 14.

Figure 18:
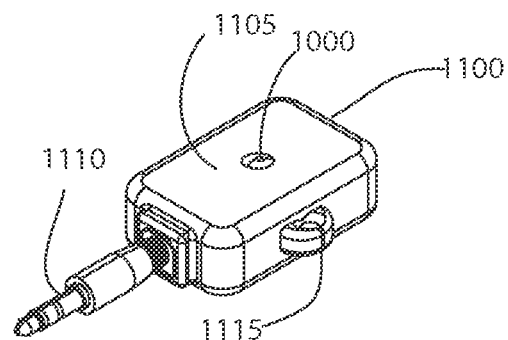
FIG. 18 is a perspective view of an exemplary audio plug-in synthetic barcode module assembly according to principles of the invention.

Referring now to FIG. 18, an embodiment of an exemplary audio plug-in synthetic barcode module 1100 is conceptually illustrated. The module 1100 includes a housing 1105 that contains the electronic and optical components, such as the components described above with reference to FIGS. 14 and 15. The housing 1105 not only encloses electronic and optical components to protect them from physical forces and the environment, but also serves an aesthetic function being pleasing to the eye. The housing 1105 also provides a framework to mount components such as an LED 1000, a connector 1110 and a keychain ring 1115.

Optionally, the module 1100 may contain a battery as a power supply. Alternatively, the module may receive power through a power and data port of a smart phone or other electronic appliance. If the module 1100 includes a microphone jack that accepts an external microphone, such as a condenser microphone, a small amount of power may be supplied to the microphone jack.

Figure 19:
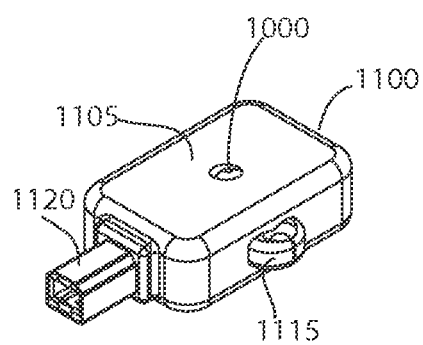
FIG. 19 is a perspective view of an exemplary USB plug-in synthetic barcode module assembly according to principles of the invention.

The embodiment in FIG. 19 is similar to the embodiment in FIG. 18, except that the embodiment in FIG. 19 includes a USB connector 1120 instead of an analog audio connector 1110. A USB plug-in is described briefly below.

The analog audio connector 1110 provides an analog signal coupling with a compatible electronic device such as a smart phone. By way of example and not limitation, connector 1110, which comprises the audio interface 325, is an analog audio plug that mates with the receptacle of an analog audio jack of an electronic device by plugging into the device. A two contact TS connector (tip, sleeve), a three contact TRS connector (tip, ring, sleeve) or a four contact TRRS connector, also called an audio jack, stereo plug, mini-jack, or headphone jack may be used. A three- or four-conductor 2.5 mm analog audio jack is widely used on smart phones, providing mono (three conductor) or stereo (four conductor) sound and a microphone input.

Optionally, a keychain ring 1115 is provided. The keychain ring enables attachment to a keychain. A user may attach the module 0 to keychain to ensure that the device is readily available at checkout lanes.

Figure 16:
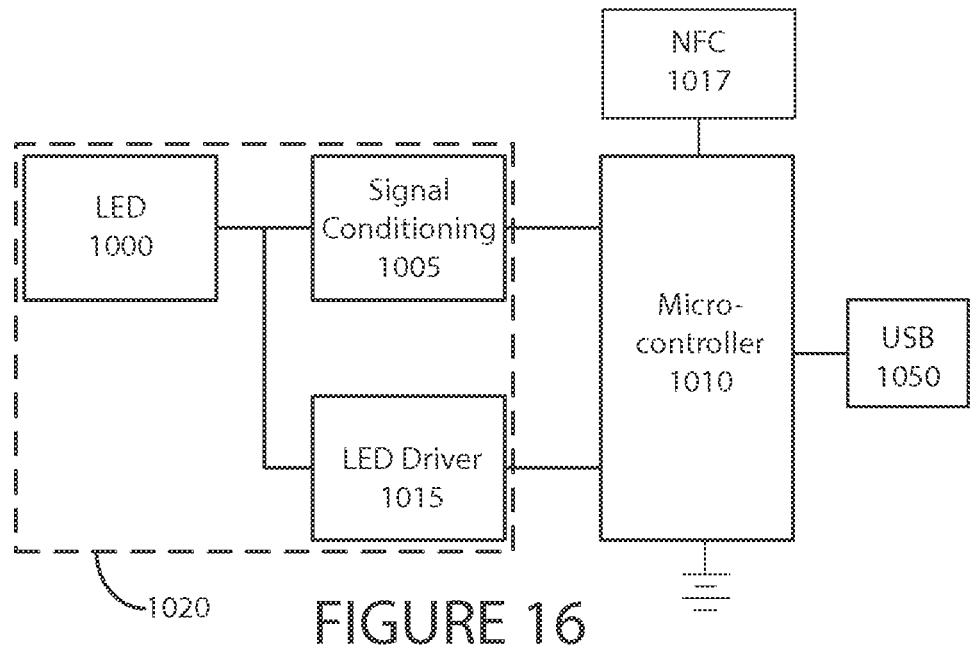
FIG. 16 provides a high level block diagram of components of an exemplary embodiment of a USB plug-in synthetic barcode module assembly according to principles of the invention.
Figure 17:
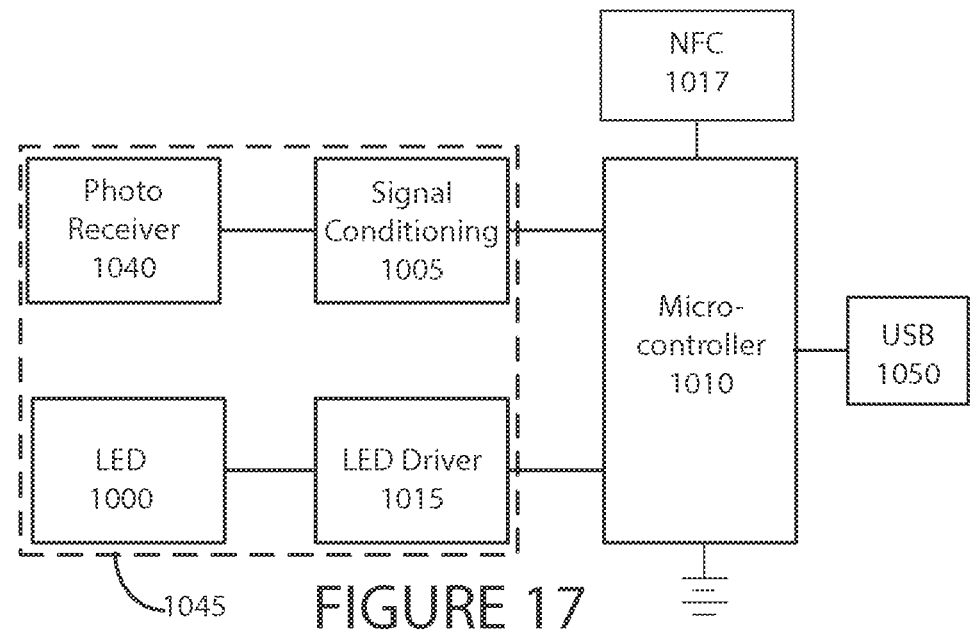
FIG. 17 provides a high level block diagram of components of another exemplary embodiment of a USB plug-in synthetic barcode module assembly according to principles of the invention.

As conceptually illustrated in FIGS. 16 and 17, a USB plug-in version of the module is conceptually illustrated. The module is essentially the same as the modules described above with reference to FIGS. 14 and 15, except that the interfaces and corresponding connectors are different. Whereas the modules in FIGS. 14 and 15 employ analog audio inputs, the modules of FIGS. 16 and 17 utilize serial interfaces, such as any one of the many available types of universal serial bus connectors. The interface 1050 provides a data and power coupling with a compatible electronic device such as a smart phone. By way of example and not limitation, the connector 1050 may be any of the various types of Universal Serial Bus (USB)-type interfaces, such as a Micro-USB interface. As some smart phones utilize proprietary interfaces, the interface may be configured for compatibility with any of the various proprietary data and power connectors.

An exemplary synthetic barcode payment methodology comprises determining if a laser barcode scanner is present; positioning a light emitter in optical communication with the laser barcode scanner; and causing the light emitter to pulse at a frequency sensible by a laser barcode scanner and in a manner to emit pulses of light that emulate light reflected from a plurality of barcodes scanned by the laser barcode scanner, said plurality of barcodes encoding payment data. The step of determining if a laser bar code scanner is present may entail receiving light from the laser bar code scanner and determining if the received light is laser light at about a frequency corresponding to the laser barcode scanner. The plurality of barcodes may comprise a plurality of UPC or EAN barcodes, and may include a first barcode indicating that a series of payment barcodes will follow and a last barcode indicating that the series of payment barcodes have been provided, with each barcode encoding a plurality of numbers, including pairs of numbers, with each pair of numbers encoding a character of a plurality of characters comprising the payment data. The light emitter may comprise an LED or display screen elements of a smart phone, such as an active matrix organic light emitting diode display or an active matrix RGB backlit liquid crystal display. The step of determining if a laser bar code scanner is present may comprise receiving light from the laser bar code scanner using an optical sensor and, using a controller operably coupled to the optical sensor, determining if the received light is laser light at about a frequency corresponding to the laser barcode scanner.

If payment by NFC is elected, the payment transaction initiates when a user positions smart phone in close proximity to an NFC point-of-sale terminal. In some implementations, proximity may entail physical contact between phone and terminal or may be contactless. This wireless communication uses a short range radio-frequency-identification communication protocol, such as near field communication. In response to detecting that phone is proximate to the terminal, the terminal may provide information about the financial transaction (such as items being purchased, an amount due, a financial threshold above which validation is required in order to conduct the financial transaction, etc.). In addition, the terminal may request payment information (such as credit- or debit-card data or information) from the phone. When this request is received, the phone provides the payment information. This back-and-forth handshaking may continue until the financial transaction is complete. The wireless communication between electronic devices involves the exchange of packets that include the information about the financial transaction, the payment information, etc. These packets may be included in frames in one or more wireless channels. Processing a packet or frame entails receiving wireless signals with the packet or frame; decoding/extracting the packet or frame from received wireless signals to acquire the packet or frame; and processing the packet or frame to determine information contained in the packet or frame (such as the information about the financial transaction, the payment information, etc.).

An NFC module the electronic device may comprise a transceiver for contactless communication at 13.56 MHz, such as, but not limited to a PN532 transceiver module by NXP Semiconductors, which can operate as a reader, writer, card emulater and peer to peer communications module. The module also includes an NFC antenna, which may comprise an inductor, with an inductance between 300 nH and 3 µH, low parasitic capacitance, and a self-resonance frequency in excess of 35 MHz. In one exemplary embodiment, a ferrite backed wire loop antenna, such as a W7002 by Pulse Electronics, or a PCB stamp antenna, such as W7001 by Pulse Electronics, may be utilized. These and other elements may comprise the NFC module. However, an NFC module according to principles of the invention is not limited to a particular design or configuration, so long as it enables short range contactless communication of transaction information at about 13.56 MHz to a compatible POS NFC terminal.

The NFC module may employ passive detection—i.e., detect the presence of an NFC payment terminal by the response of the antenna of the smart phone. When a sufficient field (e.g., magnetic or RF field) is induced in the antenna, the NFC module is activated. The level needed for wake-up may be configurable and stored in a non-volatile register of the transceiver, or other component of the smart phone. Other methods of detection may entail receiving user input (e.g., to activate the NFC module) or periodically sending a signal and awaiting a reply from the payment terminal.

Figure 20:
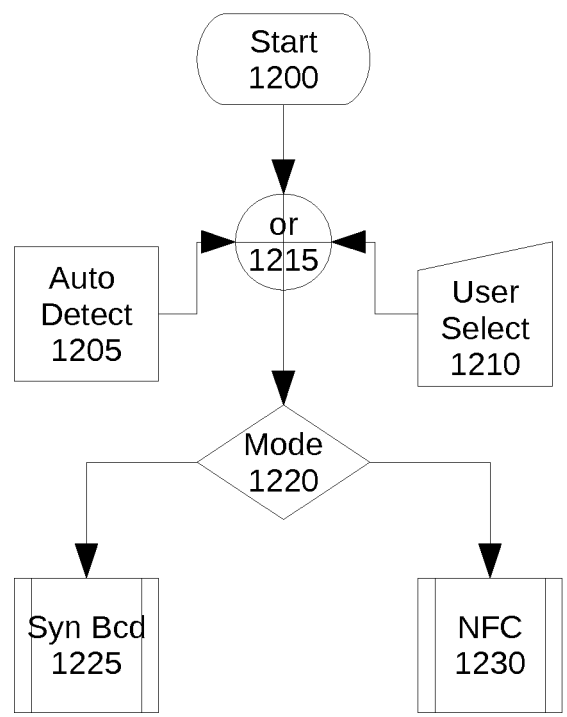
FIG. 20 is a high level flow chart of a method of selecting a wireless payment gateway according to principles of the invention.

With reference to FIG. 20, a high level flow chart of a method of selecting a wireless payment gateway according to principles of the invention is provided. The method is implemented in software and/or firmware and hardware. The method determines whether to proceed with payment via synthetic barcode, as in step 1225, or NFC, as in step 1230. Upon making the determination, control may be passed to the appropriate module, i.e., the synthetic barcode module or NFC module. The process may start when an application is initialized, as in step 1200. A method of payment may be auto-detected or user selected, as in steps 1205-1215. Auto-detection may entail, for NFC, detecting the presence of an NFC payment terminal by the response of the antenna of the smart phone, as described herein. For synthetic barcode payment, detection may entail detecting the presence of a laser scanner, as described above. If an NFC payment terminal is not detected and a laser barcode scanner is detected, then the mode of payment is set to synthetic barcode, as in step 1220, and payment information is communicated to the laser barcode scanner via synthetic barcode, in accordance with step 1225. If an NFC payment terminal is detected, then the mode of payment is set to NFC, as in step 1220, and payment information is communicated to a payment terminal via an NFC module, in accordance with step 1230.

Figure 22:
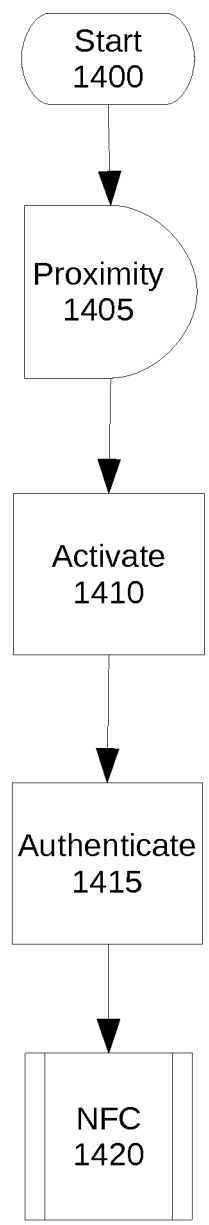
FIG. 22 is a high level flow chart of a method of paying via NFC according to principles of the invention.

With reference to FIG. 22, if payment by NFC is elected, the payment transaction initiates, as in step 1400, when a user positions smart phone in close proximity to an NFC point-of-sale terminal, as in step 1405. To proceed (step 1400) the user may be required to start an application or select an NFC payment option in a running application. In some implementations, proximity may entail physical contact between phone and terminal or may be contactless. This wireless communication uses a short range radio-frequency-identification communication protocol, such as near field communication. In response to detecting that phone is proximate to a compatible NFC payment terminal, the NFC payment module in the phone is activated, as in step 1410. The transaction may require authentication to proceed, as in step 1415. Such authentication may comprise a PIN, a biometric input (e.g., fingerprint scan or facial recognition) or some other form of authenticating user input on the smart phone. The NFC payment terminal may provide information about the financial transaction (such as items being purchased, an amount due, a financial threshold above which validation is required in order to conduct the financial transaction, etc.). In addition, the terminal may request payment information (such as credit- or debit-card data or information) from the phone. When this request is received, the phone provides the payment information, as in step 1420. This back-and-forth handshaking may continue until the financial transaction is complete. The wireless communication between electronic devices involves the exchange of packets that include the information about the financial transaction, the payment information, etc. These packets may be included in frames in one or more wireless channels. Processing a packet or frame entails receiving wireless signals with the packet or frame; decoding/extracting the packet or frame from received wireless signals to acquire the packet or frame; and processing the packet or frame to determine information contained in the packet or frame (such as the information about the financial transaction, the payment information, etc.).

An NFC module the electronic device may comprise a transceiver for contactless communication at 13.56 MHz, such as, but not limited to a PN532 transceiver module by NXP Semiconductors, which can operate as a reader, writer, card emulater and peer to peer communications module. The module also includes an NFC antenna, which may comprise an inductor, with an inductance between 300 nH and 3 µH, low parasitic capacitance, and a self-resonance frequency in excess of 35 MHz. In one exemplary embodiment, a ferrite backed wire loop antenna, such as a W7002 by Pulse Electronics, or a PCB stamp antenna, such as W7001 by Pulse Electronics, may be utilized. These and other elements may comprise the NFC module. However, an NFC module according to principles of the invention is not limited to a particular design or configuration, so long as it enables short range contactless communication of transaction information at about 13.56 MHz to a compatible POS NFC terminal.

The NFC module may employ passive detection—i.e., detect the presence of an NFC payment terminal by the response of the antenna of the smart phone. When a sufficient field (e.g., magnetic or RF field) is induced in the antenna, the NFC module is activated. The level needed for wake-up may be configurable and stored in a non-volatile register of the transceiver, or other component of the smart phone. Other methods of detection may entail receiving user input (e.g., to activate the NFC module) or periodically sending a signal and awaiting a reply from the payment terminal.

Figure 21:
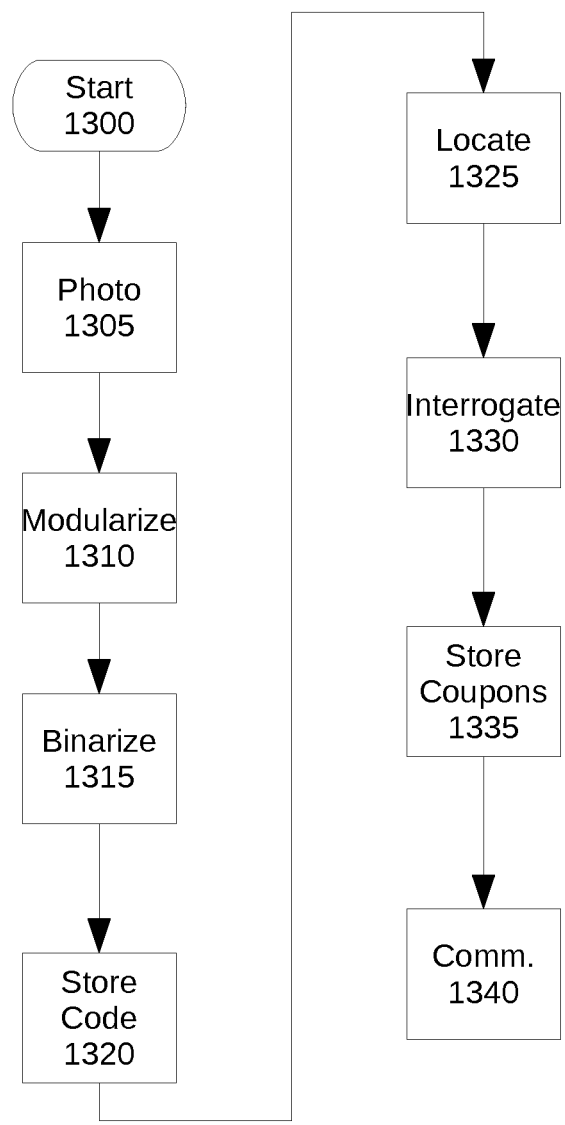
FIG. 21 is a high level flow chart of a method of recognizing barcodes for items to be purchased and finding coupons for such items according to principles of the invention.

FIG. 21 is a high level flow chart of a method of recognizing barcodes for items to be purchased and finding coupons for such items according to principles of the invention. A method and system according to principles of the invention may entail photographing and digitizing barcodes of items being purchased to create a list and obtain coupons. Coupon data may be communicated as part of the payment data. The process entails initializing an application, as in step 1300. The barcode of each product is photographed in gray scale, as in step 1305. The photograph is modularized based upon the barcode parameters, as in step 1310. Pixels darker than a threshold are considered black, while pixels below the threshold are considered white, according to the binarizing step 1315.

Standardized barcodes have certain specific proportions. In UPC-A, for example, the x-dimension is the width of single module element, which is nominally 0.33 mm (0.013 in.). In UPC-A the dark bars forming the Start, Middle, and End guard bars are extended downwards by 5 times x-dimension, with a resulting nominal symbol of height of 27.55 mm (1.08 in.). This also applies to the bars of the first and the last symbol characters of UPC-A symbol. UPC-A can be reduced or magnified anywhere from 80% to 200%. By determining areas comprising black bars and white spaces, a barcode is determined.

The barcode is stored in a table, list, array or other data structure, as in step 1320. Stored barcodes are used to access one or more databases for price look-up data, coupons, rebates and other information pertinent to a sales transaction.

The user's geographic location may be determined, as in step 1325, using any of various location methodologies. Location may be user input or automatically determined using GPS data, IP trace or triangulation information. Some smart phones may be equipped with a Global Positioning System ("GPS") receiver for receiving signals from GPS satellites to determine location of the device. Certain smart phones may not have access to a GPS service (for example, they may lack hardware necessary to support such a service); consequently, such GPS information may not be available for all users. Also, it is observed that certain GPS services do not operate in certain locations, such as indoors. Thus, even if a user does have the necessary hardware and software to support a GPS service, occasionally GPS information from the GPS service may not be available to a particular user.

IP trace information may include the public IP address of the user and the set of IP addresses that data packets sent from the user pass through to reach a server. The public IP address of the user may be determined by gathering a source IP address from a server socket receiving the user connection. The list of hops through which the data packets sent from the user go through may be determined by sending adaptive TTL (time to live) UDP packets to server from the user. In order to determine if the user is using an IP proxy, the server may correlate the list of hops with the public IP address of the user. In this way, the server may effectively discover the real public IP address of the user. The real public IP address of the user is then matched against a database of Internet Service Providers (ISPs) which returns the probable address of the originating user message. This probable address of the originating user message may then be translated to a set of longitude and latitude coordinates.

Triangulation information for a user may include a list of public Wi-Fi or cellular access points surrounding the user as well as the signal strength of each Wi-Fi or cellular access point accessible by the user. The list of surrounding Wi-Fi and cellular access points, and their signal strength, may be formatted and correlated with a database of public Wi-Fi and cellular access points by the server to determine a probable set of longitude and latitude coordinates for the user. The database of public Wi-Fi or cellular access points employed by the server may be updated over time to reflect new information about available Wi-Fi and cellular access points.

The invention is not dependent upon location information. Certain implementations of the invention may not take location into consideration. In implementations that take location into consideration, certain types of location data may be more accurate or reliable than others. GPS information is more accurate and indicative of the correct physical location of a user; however, as explained above, GPS information for a particular user may not always be available. Triangulation information, while not as accurate and reliable in identifying the correct physical location of a user as GPS information, is more accurate and reliable than IP trace information. However, triangulation information also may not always be available, e.g., the user may not be able to detect any nearby recognizable Wi-Fi or cellular access points. Additionally, while IP trace information is less accurate than either GPS information or triangulation information in determining the correct location of a user, it is always obtainable if the user can communicate to the server over the Internet. Additionally, a user may input location (e.g., an address). Location is used to determine the retailer, for retailer-specific coupons, rebates and the like. Location may be correlated with a business directory to determine a retailer.

After determining location and the items to be purchased, as in steps 1320 and 1325, one or more data sources are queried for coupons, rebates and other types of discounts that may apply to the items being purchased and/or sales at the particular retail establishment, as in step 1330. Information for coupons, rebates, and other discounts are stored, as in step 1335. The stored information may be communicated to the point of sale terminal via synthetic barcode or NFC, as part of the payment transaction, as in step 1340.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A contactless short range payment methodology comprising:
   determining if a near field communication payment terminal is present;
   if it is determined that a near field payment terminal is not present, determining if a laser barcode scanner is present, wherein determining if the laser bar code scanner is present comprises receiving light from the laser bar code scanner using an optical sensor and, using a controller operably coupled to the optical sensor, determining if the received light is laser light having a frequency substantially corresponding to the laser barcode scanner;
   if it is determined that the laser barcode scanner is present, positioning a light emitter in optical communication with the laser barcode scanner; and
   causing the light emitter to pulse at a frequency sensible by a laser barcode scanner and in a manner to emit pulses of light that emulate light reflected from a plurality of barcodes scanned by the laser barcode scanner, said plurality of barcodes encoding payment data.

2. The contactless short range payment methodology according to claim 1, wherein the step of determining if a near field communication payment terminal is present, comprises receiving a first user input.

3. The contactless short range payment methodology according to claim 1, wherein the step of determining if a near field communication payment terminal is present, comprises sensing the presence of a near field communication payment terminal by antenna response.

4. The contactless short range payment methodology according to claim 1, said plurality of barcodes comprising a plurality of UPC barcodes.

5. The contactless short range payment methodology according to claim 4, said plurality of barcodes including a last barcode indicating that the series of payment barcodes have been provided.

6. The contactless short range payment methodology according to claim 1, said plurality of barcodes comprising a plurality of EAN barcodes.

7. The contactless short range payment methodology according to claim 1, said plurality of barcodes including a first barcode indicating that a series of payment barcodes will follow.

8. The contactless short range payment methodology according to claim 1, each barcode encoding a plurality of numbers, said plurality of numbers comprising pairs of numbers, each pair of numbers encoding a character of a plurality of characters comprising the payment data.

9. The contactless short range payment methodology according to claim 1, wherein the light emitter comprises display screen elements of smart phone, said display screen elements comprising one of an active matrix organic light emitting diode display and an active matrix RGB backlit liquid crystal display.

10. The contactless short range payment methodology according to claim 1, wherein the light emitter comprises an LED.

11. The contactless short range payment methodology according to claim 1, said optical sensor comprising a charged couple device camera.

12. The contactless short range payment methodology according to claim 1, said optical sensor comprising a CMOS camera.

13. The contactless short range payment methodology according to claim 1, said optical sensor comprising an ambient light sensor.

14. The contactless short range payment methodology according to claim 1, if a near field communication payment terminal is present communicating payment information to the near field communication payment terminal via near field communication.

* * * * *